US012611838B2

(12) United States Patent
Wang

(10) Patent No.: US 12,611,838 B2
(45) Date of Patent: Apr. 28, 2026

(54) DISPLAY MODULE AND DISPLAY DEVICE

(71) Applicant: Xiamen Tianma Display Technology Co., Ltd., Xiamen (CN)

(72) Inventor: Peng Wang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 413 days.

(21) Appl. No.: 18/203,458

(22) Filed: May 30, 2023

(65) Prior Publication Data

US 2024/0219968 A1 Jul. 4, 2024

(30) Foreign Application Priority Data

Dec. 28, 2022 (CN) .......................... 202211696549.X

(51) Int. Cl.
B32B 3/08 (2006.01)
B32B 3/02 (2006.01)
B32B 3/06 (2006.01)
B32B 3/14 (2006.01)

(52) U.S. Cl.
CPC .................. B32B 3/08 (2013.01); B32B 3/02 (2013.01); B32B 3/06 (2013.01); B32B 3/14 (2013.01)

(58) Field of Classification Search
CPC .... B32B 3/08; B32B 3/02; B32B 3/06; B32B 3/14

USPC .......................................................... 428/192
See application file for complete search history.

(56) References Cited

U.S. PATENT DOCUMENTS

2024/0219968 A1* 7/2024 Wang .................... G06F 1/1616

FOREIGN PATENT DOCUMENTS

CN 216388602 U 4/2022

OTHER PUBLICATIONS

CN 216388602 U Machine Translated (Year: 2022).*

* cited by examiner

*Primary Examiner* — Betelhem Shewareged
(74) *Attorney, Agent, or Firm* — Anova Law Group, PLLC

(57) ABSTRACT

A display module and a display device are provided. The display module includes a display panel, a first cover plate on a side of the display panel, and a protection layer. An edge of an orthographic projection of the first cover plate on a first plane is located inside an edge of an orthographic projection of the display panel on the first plane. The first plane is a plane where the display module is located. The protection layer is attached to at least part of side edges of the first cover plate, and is elastic.

13 Claims, 15 Drawing Sheets

S100

Providing a display panel is provided, where the display panel includes a surface to be bonded

S200

Providing a first cover plate, and bonding the first cover plate to a side of the display panel with the surface to be bonded

S300

Attaching a protection layer to at least part of side edges of the first cover plate, where the protection layer is elastic

DISPLAY MODULE AND DISPLAY DEVICE

CROSS-REFERENCE TO RELATED APPLICATION

This application claims the priority of Chinese Patent Application No. 202211696549.X, filed on Dec. 28, 2022, the content of which is incorporated herein by reference in its entirety.

TECHNICAL FIELD

The present disclosure generally relates to the field of communication and display technology and, more particularly, relates to a display module and a display device.

BACKGROUND

Foldable display modules have attracted much attention because of their advantages of thinness, high contrast, wide viewing angles, fast response and flexibility. However, in existing foldable display modules, an edge of a cover plate is prone to cracks or even breaks, thus affecting the reliability of the display modules.

SUMMARY

One aspect of the present disclosure provides a display module. The display module includes a display panel, a first cover plate on a side of the display panel, and a protection layer. An edge of an orthographic projection of the first cover plate on a first plane is located inside an edge of an orthographic projection of the display panel on the first plane. The first plane is a plane where the display module is located. The protection layer is attached to at least part of side edges of the first cover plate, and is elastic.

Another aspect of the present disclosure provides a display device. The display device includes a display module. The display module includes a display panel, a first cover plate on a side of the display panel, and a protection layer. An edge of an orthographic projection of the first cover plate on a first plane is located inside an edge of an orthographic projection of the display panel on the first plane. The first plane is a plane where the display module is located. The protection layer is attached to at least part of side edges of the first cover plate, and is elastic.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
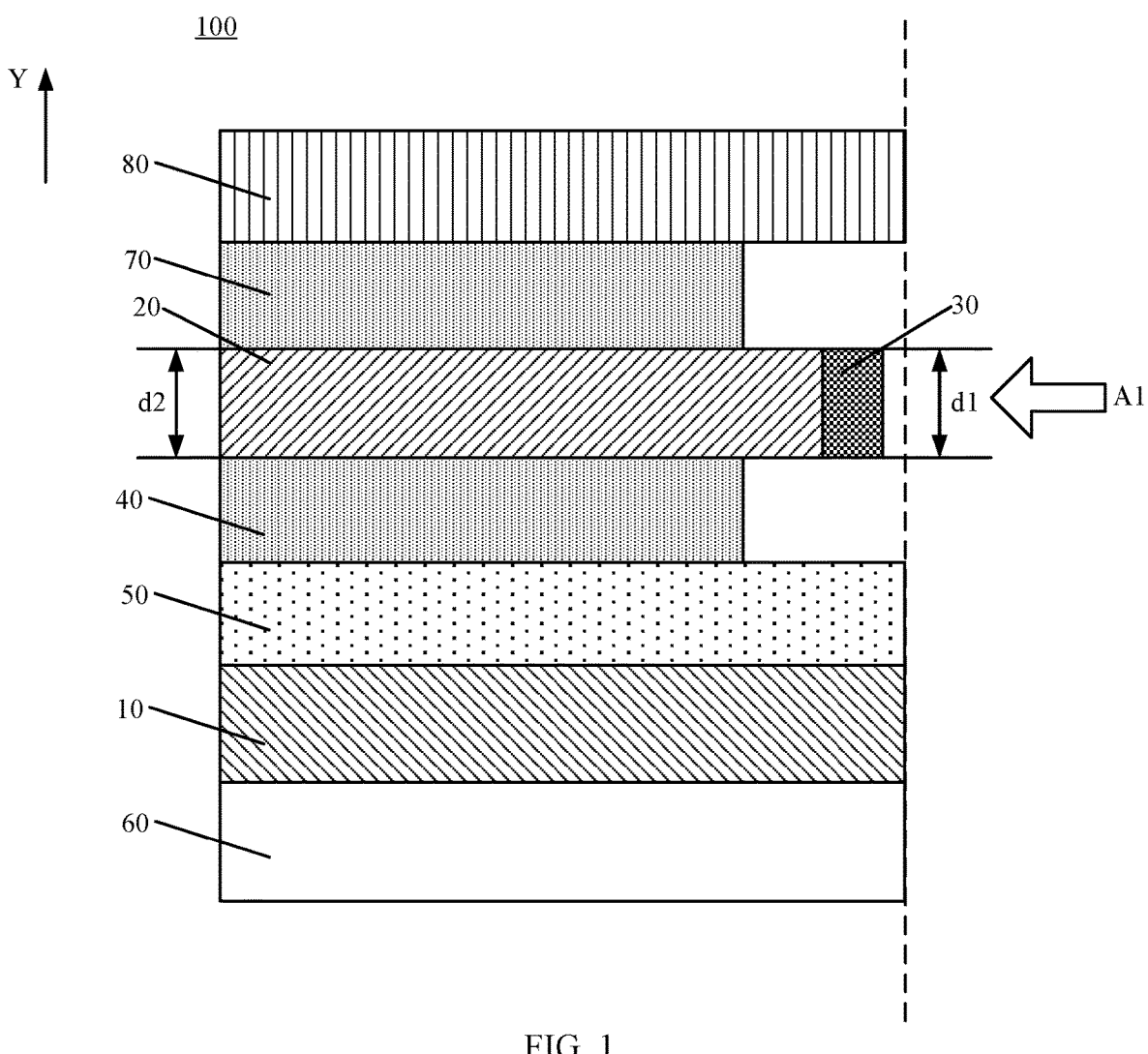
FIG. 1 illustrates a local structure of an exemplary display module consistent with various embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In existing display modules, an edge of a cover plate is prone to cracks or even breaks, thus affecting the reliability of the display modules.

The present disclosure provides a display module. In one embodiment, FIG. 1 shows a local structure of a display module 100 provided by the present embodiment. The display module 100 may include a display panel 10 and a first cover plate 20 located on one side of the display panel 10. An edge of an orthographic projection of the first cover plate 20 on the first plane may be located inside an edge of an orthographic projection of the display panel 10 on the first plane. The first plane may be a plane where the display module is located.

The display module may further include a protection layer 30 that is attached to at least part of side edges of the first cover plate 20, and the protection layer 30 may be elastic.

One of the possible reasons why the edge of the cover plate in the display module is prone to cracks is that the cover plate is easily cut when cutting the edge of the display module to remove excess parts.

In the display module provided by the present disclosure, the edge of the orthographic projection of the first cover plate 20 on the first plane is located inside the edge of the orthographic projection of the display panel 10 on the first plane. That is, the orthographic projection of the first cover plate 20 on the first plane may be located inside the orthographic projection of the display panel 10 on the first plane, and the edge of the orthographic projection of the first cover plate 20 on the first plane may have a certain distance from the edge of the orthographic projection of the display panel 10 on the first plane. That is, the first cover plate 20 may retract relative to the display panel 10. Since the orthographic projection of the first cover plate 20 on the first plane is located within the orthographic projection of the display panel 10 on the first plane, and the edge of the orthographic projection of the first cover plate 20 on the first plane may have a certain distance from the edge of the orthographic projection of the display panel 10 on the first plane, when cutting the edge of the display module, the first cover plate 20 may be prevented from being cut, thereby preventing the edge of the first cover plate 20 from cracks when cutting the edge of the display module.

Another reason why the edge of the cover plate in the display module is prone to cracks is the effect of external impact. That is, the edge of the cover plate is prone to cracks under the action of external impact.

In the display module provided by the present disclosure, the protection layer 30 may be attached to at least part of the side edges of the first cover plate 20, and the protection layer may be elastic. Therefore, the edge of the first cover plate 20 may be protected by the protection layer 30, and it may be not easy to produce cracks due to the buffering effect of the protection layer 30 when the edge of the first cover plate 20 is impacted.

In the display module 100 provided by the embodiments of the present disclosure, the edge of the orthographic projection of the first cover plate 20 on the first plane may be configured to be located inside the edge of the orthographic projection of the display panel 10 on the first plane, such that the edge of the first cover plate 20 may be prevented from being cut to cause cracks in the fabrication process of the display module. Further, the protection layer 30 may be attached to at least part of the side edges of the first cover plate 20, and the protection layer 30 may be elastic. During the use of the display module, the edge of the first cover plate 20 may be not easily cracked due to external impact, thereby reducing the fragility of the first cover plate 20 and improving the reliability of the display module.

In one embodiment, the protection layer 30 may be a transparent protection layer. The protection layer 30 attached to at least part of the side edges of the first cover plate 20 may be transparent, such that frame design of the display module may be not affected and a narrow frame and large-screen display of the display module may be achieved.

It should be noted that the dotted line in FIG. 1 represents the edge of the display module 100. In one embodiment, the edge of the orthographic projection of the protection layer 30 on the first plane may be located inside the edge of the orthographic projection of the display panel 10 on the first plane, that is, the orthographic projection of the protection layer 30 on the first plane may be located within the orthographic projection of the display panel 10 on the first plane, and the edge of the orthographic projection of the protection layer 30 on the first plane may have a certain distance from the edge of the orthographic projection of the display panel 10 on the first plane. The present disclosure does not limit it. In other embodiments, as shown in FIG. 2, the edge of the orthographic projection of the protection layer 30 on the first plane may coincide with the edge of the orthographic projection of the display panel 10 on the first plane.

The protection layer 30 may be attached to at least part of the side edges of the first cover plate 20. Optionally, in one embodiment, the protection layer 30 may be attached to a portion of the side edges of the first cover plate 20 that is vulnerable to impact. Optionally, in another embodiment, the protection layer 30 may be disposed around the periphery of the first cover plate 20, that is, the protection layer 30 may be attached to the entire periphery of the first cover plate 20. Therefore, the protection layer 30 may protect all side edges of the first cover plate 20 from being prone to cracks due to the buffering effect of the protection layer 30 when being impacted, further reducing the fragility of the first cover plate 20 and improving the impact resistance of the first cover plate 20.

Figure 2:
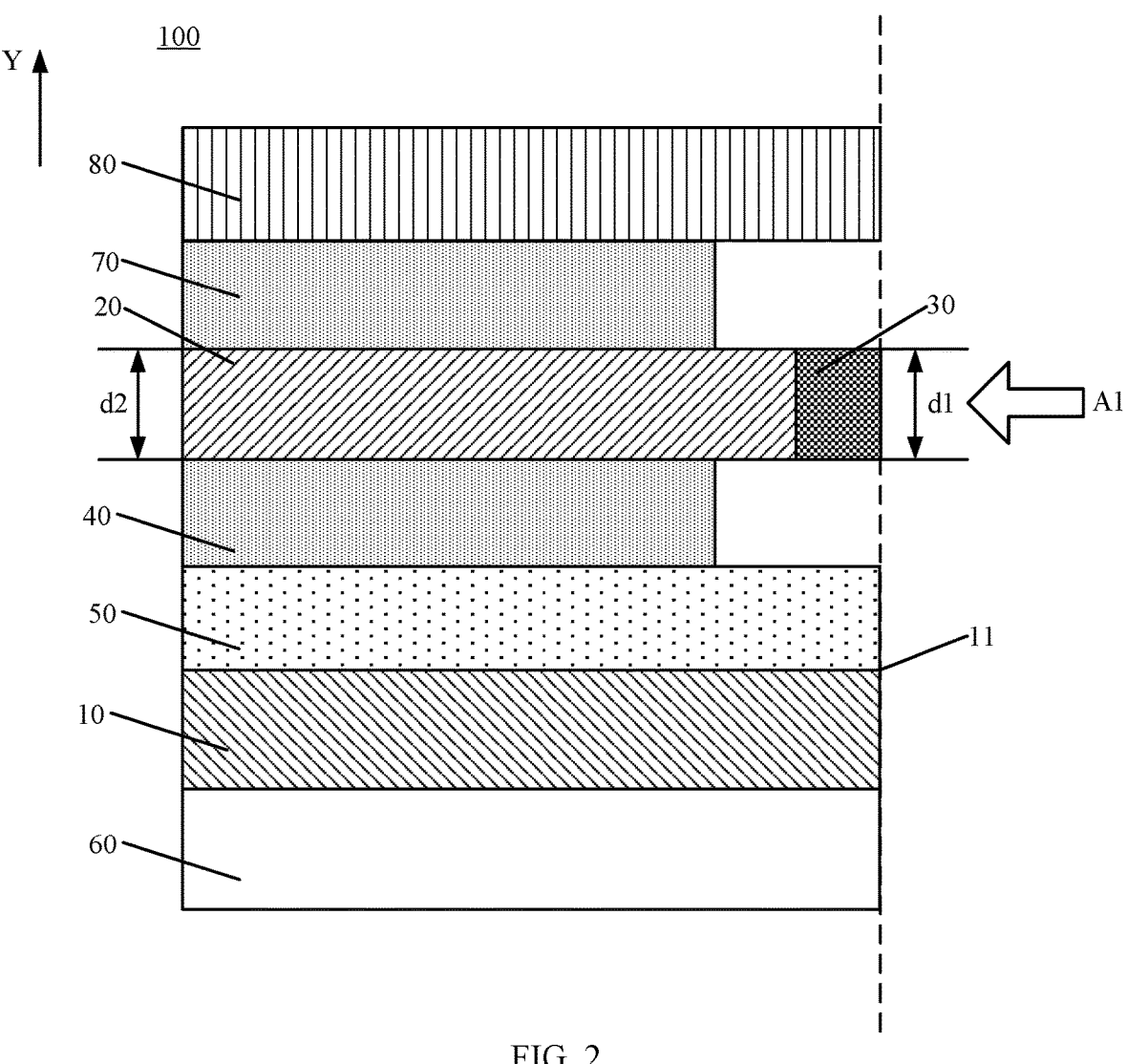
FIG. 2 illustrates another local structure of an exemplary display module consistent with various embodiments of the present disclosure.

In one embodiment, as shown in FIG. 1 and FIG. 2, in a direction Y perpendicular to the first plane, the thickness d1 of the protection layer 30 may equal the thickness d2 of the first cover plate 20. The orthographic projection of the protection layer 30 on the first plane may not overlap with the orthographic projection of the first cover plate 20 on the first plane. That is, the protection layer 30 and the first cover plate 20 may be disposed in a same layer, and the protection layer 30 may be attached to the side edges of the first cover plate 20. Therefore, when the side edges of the first cover plate 20 are impacted by the outside, the elastic protection layer 30 may act as a buffer to reduce the impact force on the side edges of the first cover plate 20, thereby making the edge of the first cover plate less prone to cracks due to external impact.

Figure 3:
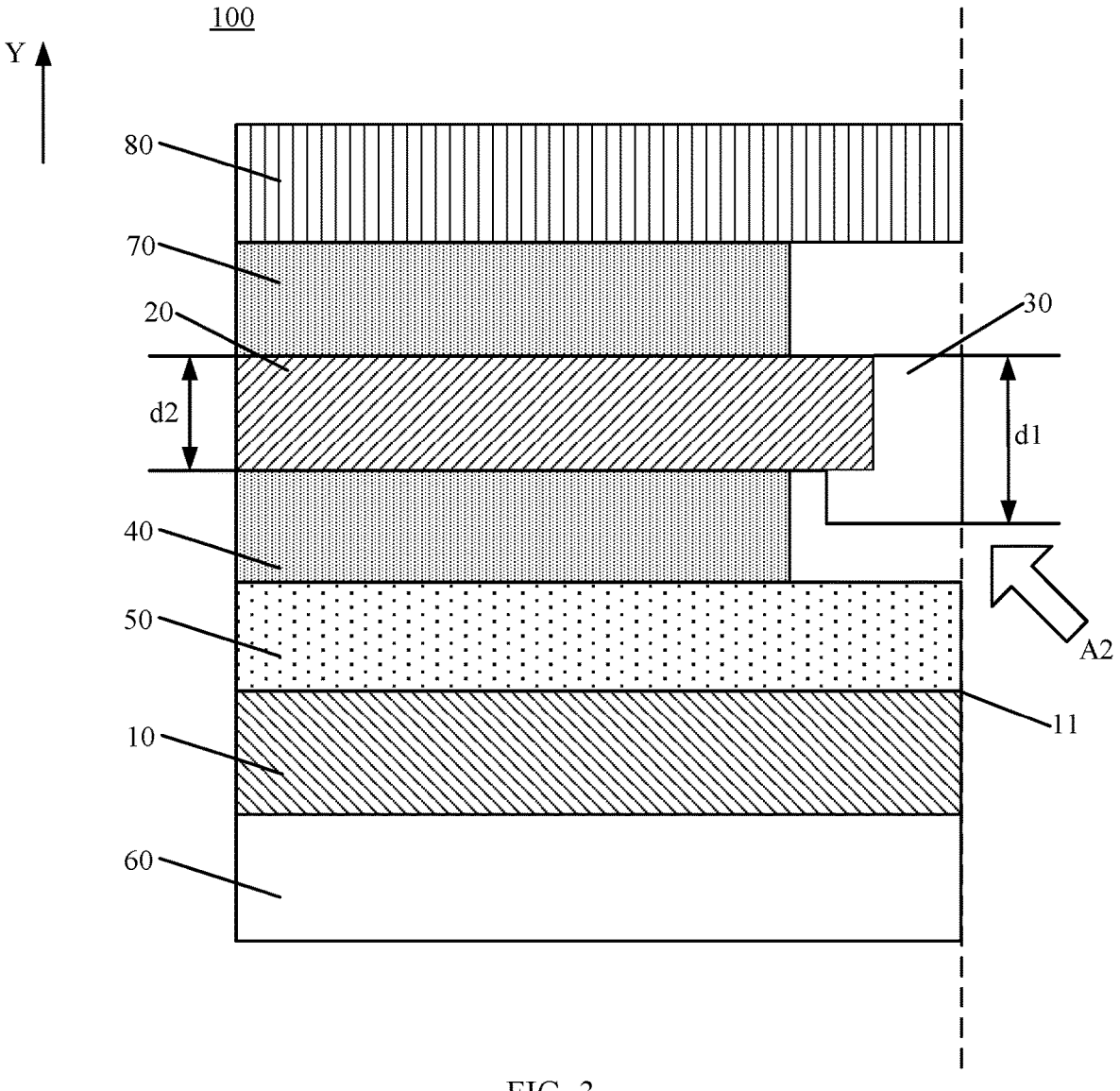
FIG. 3 illustrates another local structure of an exemplary display module consistent with various embodiments of the present disclosure.
Figure 4:
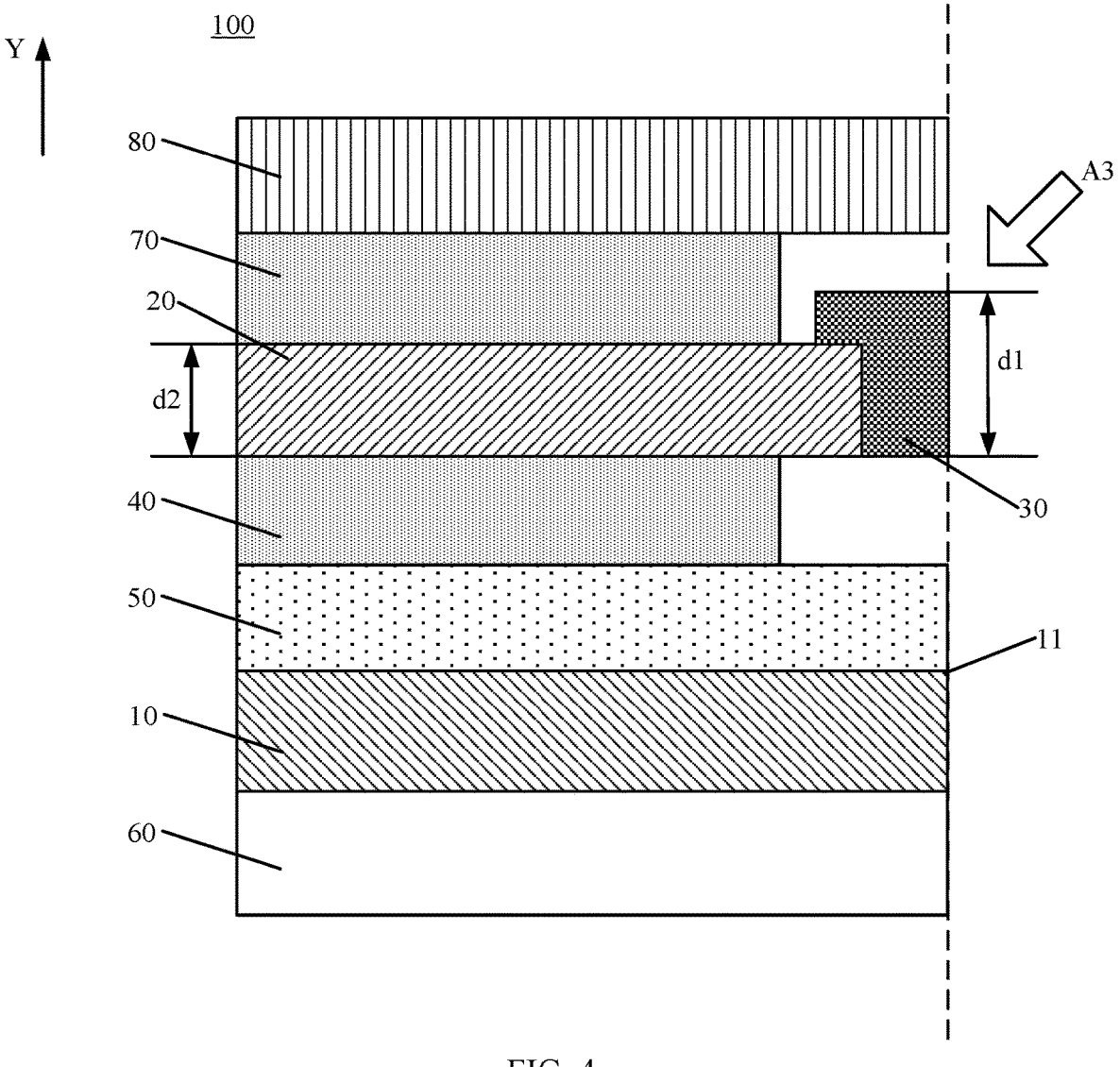
FIG. 4 illustrates another local structure of an exemplary display module consistent with various embodiments of the present disclosure.

In another embodiment, as shown in FIG. 3 and FIG. 4, in the direction Y perpendicular to the first plane, the thickness d1 of the protection layer 30 may be larger than the thickness d2 of the first cover plate 20. The orthographic projection of the protection layer 30 on the first plane may partially overlap with the orthographic projection of the first cover plate 20 on the first plane. That is, the protection layer 30 may be not only attached to the side edges of the first cover plate 20, but also extend from the side edges of the first cover plate 20 to a surface of the first cover plate 20 facing the display panel 10 (specifically as shown in FIG. 3), or extend to a surface of the first cover plate 20 away from the display panel 10 (specifically as shown in FIG. 4), or extend to both the surface of the first cover plate 20 facing the display panel 10 and the surface of the first cover plate 20 away from the display panel 10 (as specifically shown in FIG. 5). The protection layer 30 may be used to protect the side edges of the first cover plate 20 by half-enclosing or fully enclosing the first cover plate 20.

In the above embodiments, the thickness d1 of the protection layer 30 in the direction Y perpendicular to the first plane may be the maximum thickness of the protection layer 30 in the direction Y perpendicular to the first plane.

Figure 5:
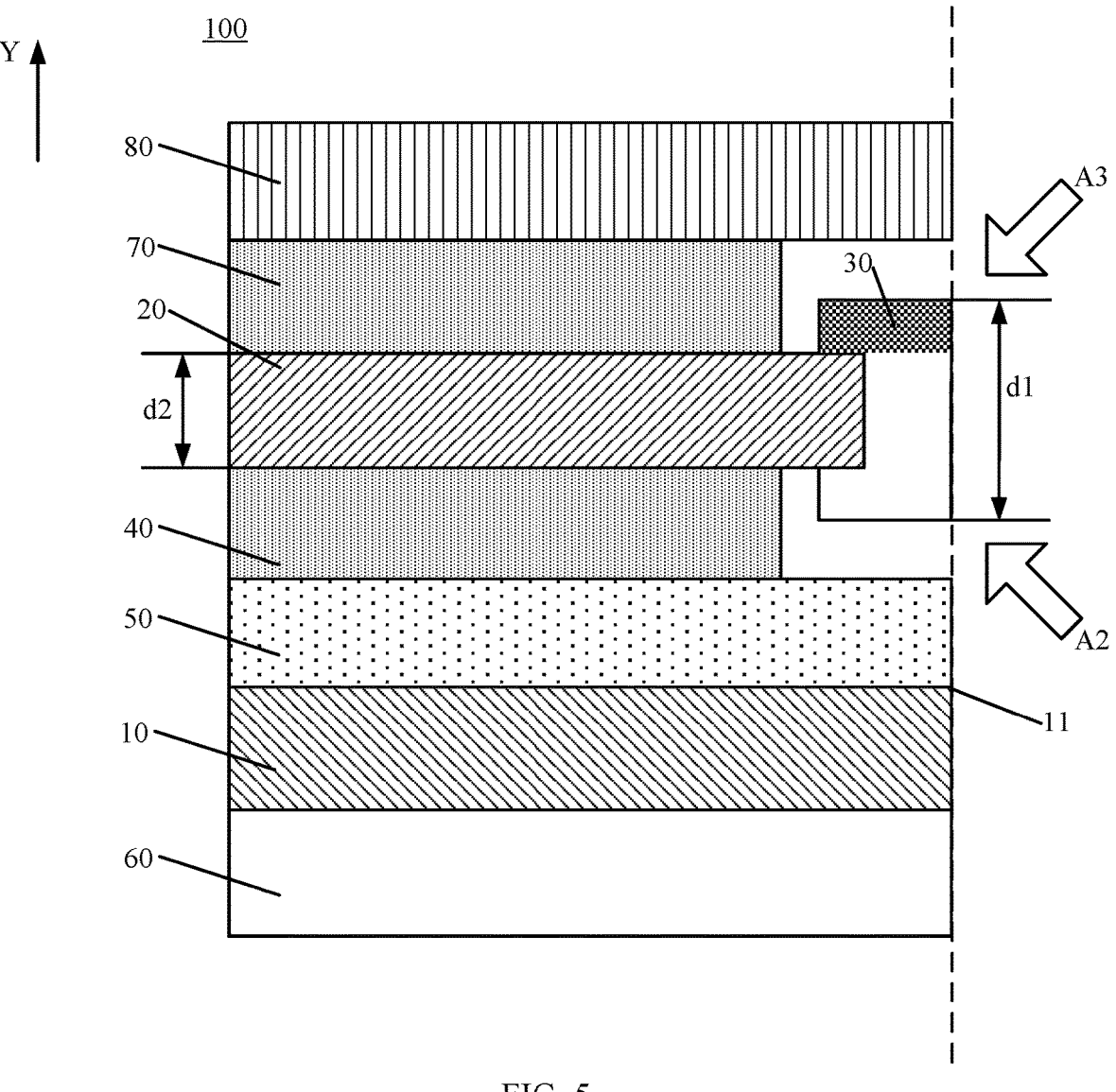
FIG. 5 illustrates another local structure of an exemplary display module consistent with various embodiments of the present disclosure.

When the side edges of the first cover plate 20 are subjected to an external impact, the direction of the external impact force may directly point to the side edges of the first cover plate 20, as shown by the arrow A1 in FIG. 1 and FIG. 2, and also may point to the side edges of the first cover plate 20 obliquely toward a side of the first cover plate 20 facing the display panel 10, as shown by the arrow A2 in FIG. 3 and FIG. 5. The impact force pointing to the side edges of the first cover plate 20 obliquely may be prone to induce cracks on the sides of the surfaces of the first cover plate 20 facing and/or away from the display panel 10. Based on this, in this embodiment, not only the side edges of the first cover plate 20 may be protected by the protection layer 30 attached to the side edges of the first cover plate 20, but also the edge portion of the surfaces of the first cover plate 20 facing and/or away from the display panel 10 may be protected by using a portion of the protection layer 30 extending to the surfaces of the first cover plate 20 facing and/or away from the display panel 10, to enhance the protection of the side edges of the first cover plate 20.

Further, compared to the protection layer 30 that is only attached to the side edges of the first cover plate 20 (that is, the protection layer 30 is only bonded to the side edges of the first cover plate 20), in the present embodiment, the protection layer 30 may be not only bonded together with the side edges of the first cover plate 20, but also bonded together with the edge portion of the surfaces of the first cover plate 20 facing and/or away from the display panel 10. Therefore, the contact area between the protection layer 30 and the first cover plate 20 may be increased, such that the protection layer 30 may be firmer and not easy to fall off from the side edges of the first cover plate 20.

In practical application, the display panel 10 and the first cover plate 20 may be bonded together through an adhesive layer 40. As shown in FIGS. 1-5, the display module 100 may further include a first adhesive layer 40 between the first cover plate 20 and the display panel 10. In existing technologies, an edge of an orthographic projection of the first adhesive layer 40 on the first plane is located inside the edge of the orthographic projection of the first cover plate 20 on the first plane, that is, the orthographic projection of the first adhesive layer 40 on the first plane is located within the orthographic projection of the first cover plate 20 on the first plane. The edge of the orthographic projection of the first adhesive layer 40 on the first plane may have a certain distance from the orthographic projection of the first cover plate 20 on the first plane, that is, the first adhesive layer 40 shrinks inward relative to the edge of the first cover plate 20, to prevent the first adhesive layer 40 from overflowing.

Figure 6:
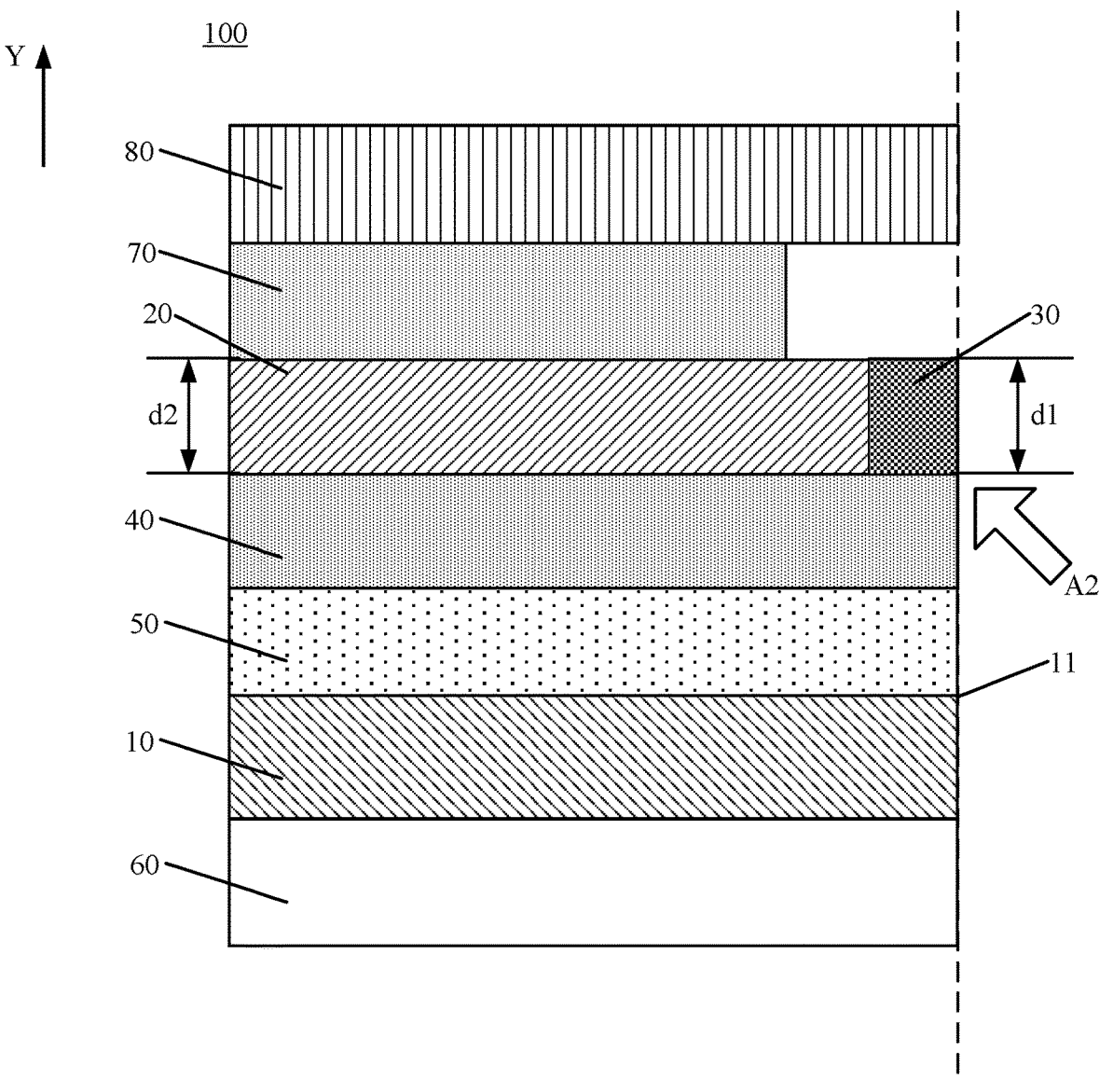
FIG. 6 illustrates another local structure of an exemplary display module consistent with various embodiments of the present disclosure.

To increase the firmness of the bonding between the protection layer 30 and the side edges of the first cover plate 20, in one embodiment shown in FIG. 6, the edge of the orthographic projection of the first adhesive layer 40 on the first plane may be located outside the edge of the orthographic projection of the first cover plate 20 on the first plane, and the orthographic projection of the first adhesive layer 40 on the first plane may at least partially overlap the orthographic projection of the protection layer 30 on the first plane.

In this embodiment, the edge of the orthographic projection of the first adhesive layer 40 on the first plane may be located outside the edge of the orthographic projection of the first cover plate 20 on the first plane. That is, the orthographic projection of the first cover plate 20 on the first plane may be located inside the orthographic projection of the first adhesive layer 40 on the first plane, and there may be a certain distance between the edge of the orthographic projection of the first cover plate 20 on the first plane and the edge of the orthographic projection of the first adhesive layer 40 on the first plane. The first adhesive layer 40 may expand outward relative to the edge of the first cover plate 20.

Further, the orthographic projection of the first adhesive layer 40 on the first plane and the orthographic projection of the protection layer 30 on the first plane may at least partially overlap. Since the protection layer 30 may be attached to at least part of the side edges of the first cover plate 20, the first adhesive layer 40 may expand outwards relative to the edge of the first cover plate 20 to at least partially contact the protection layer 30, enhancing the fixation of the protection layer 30. At this time, not only the protection layer 30 may be able to act as a buffer when the side edges of the first cover plate 20 are directly impacted, but also the portion of the first adhesive layer 40 expanding outwards with respect to the edge of the first cover plate 20 may act as a buffer when the first cover plate 20 is subjected to an impact pointing obliquely from the side of the first cover plate 20 facing the display panel 10 to the side edges of the first cover plate 20 as shown by arrow A2 in FIG. 6, to further enhance the protection effect on the side edges of the first cover plate 20.

The embodiment shown in FIG. 6 where the thickness d1 of the protection layer 30 is equal to the thickness d2 of the first cover plate 20 in the direction Y perpendicular to the first plane is used as an example only to illustrate the present disclosure, and does not limit the scope of the present disclosure. The same may be applied to the case where the thickness d1 of the protection layer 30 is larger than the thickness d2 of the first cover plate 20 in the direction Y perpendicular to the first plane.

The embodiment shown in FIG. 6 where the orthographic projection of the protection layer 30 on the first plane completely overlaps the orthographic projection of the first adhesive layer 40 on the first plane is used as an example only to illustrate the present disclosure, and does not limit the scope of the present disclosure. In some other embodiment, the orthographic projection of the protection layer 30 on the first plane may partially overlap the orthographic projection of the first adhesive layer 40 on the first plane.

Figure 7:
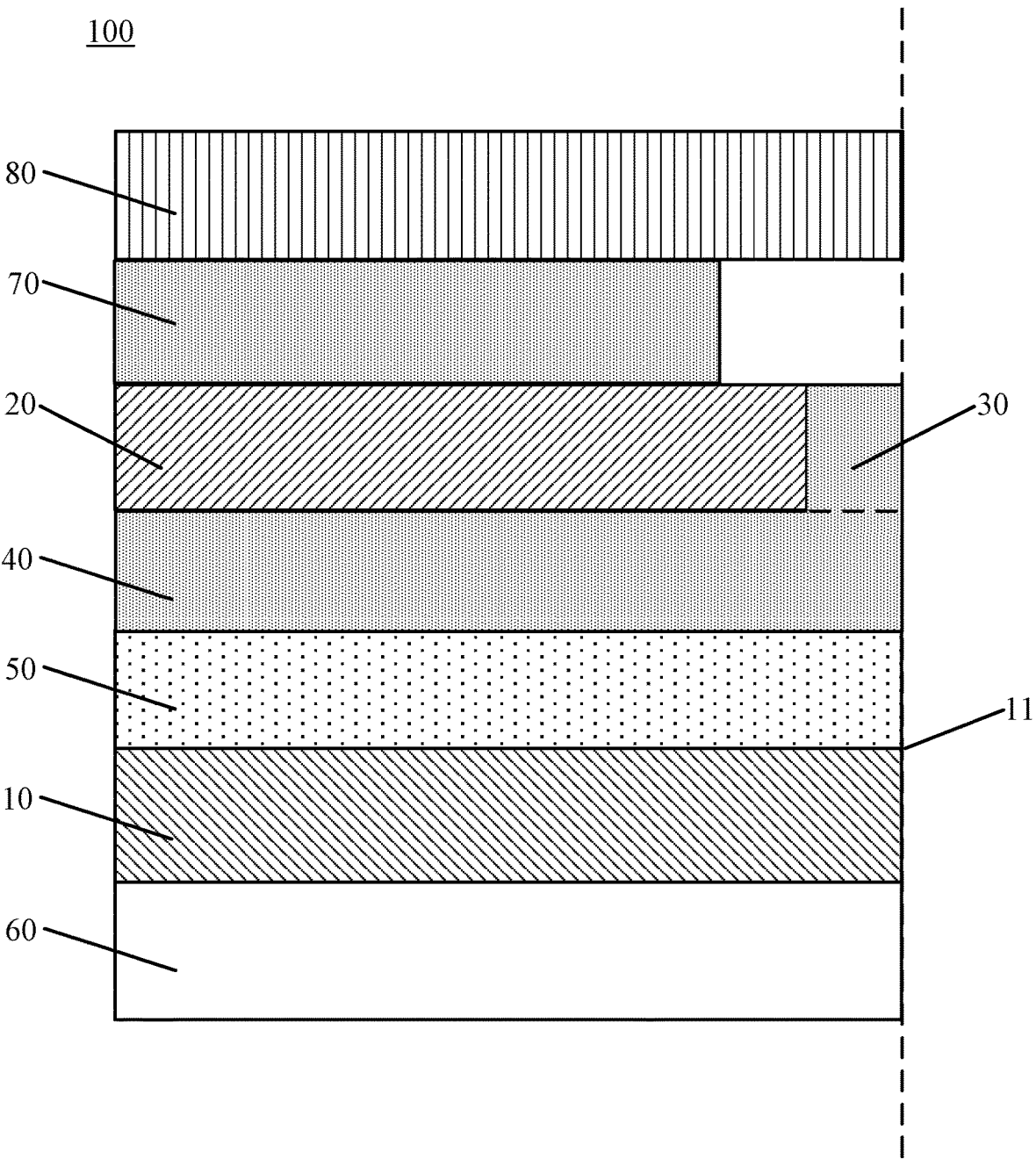
FIG. 7 illustrates another local structure of an exemplary display module consistent with various embodiments of the present disclosure.

In one embodiment shown in FIG. 7, the protection layer 30 and the first adhesive layer 40 may be integrally formed, that is, the protection layer 30 may be formed by the first adhesive layer 40 extending to the side edges of the first cover plate 20. Specifically, the display panel 10 may further include a surface to be bonded 11, and the first adhesive layer 40 may be coated on a side of the surface to be bonded 11 of the display panel 10 first, and the first cover plate 20 may be bonded to the side of the display panel 10 with the surface to be bonded 11 by using the first adhesive layer 40. The edge of the orthographic projection of the first adhesive layer 40 on the first plane may be located outside the edge of the orthographic projection of the first cover plate 20 on the first plane. Then, a roller may roll back and forth on the side of the first cover plate 20 away from the display panel 10, such that the first adhesive layer 40 extends to the side edges of the first cover plate 20 to form the protection layer attached to the side edges of the first cover plate 20.

As shown in FIGS. 1-7, a polarizer 50 may be usually provided on the side of the display panel 10 close to the first cover plate 20, and the polarizer 50 may be attached to the display panel 10 through pressure sensitive adhesive (PSA). Correspondingly, when the first adhesive layer 40 is coated on the side of the display panel 10 with the surface to be bonded 11, the first adhesive layer 40 may be actually coated on a side of the polarizer 50 away from the display panel 10. Further, as shown in FIG. 1-7, a backplate 60 may be usually provided on the side of the display panel 10 away from the first cover plate 20. When the display module 100 is a foldable display module, such as a flexible organic light emitting diode (OLED) display module, the strength of the display module may be enhanced through the backplate 60, which is convenient for folding and wrapping.

In practical applications, as shown in FIGS. 1-7, on the side of the first cover plate 20 away from the display panel 10, a second cover plate 80 may be attached through a second adhesive layer 70. Specifically, the second adhesive layer 70 may be coated on the second cover plate 80 first, and then the second cover plate coated with the second adhesive layer 70 may be attached to the side of the first cover plate 20 away from the display panel 10. The process may require that the edge of the second adhesive layer 70 coated on the second cover plate 80 does not exceed the edge of the second cover plate 80. In the production process, to ensure that the edge of the second adhesive layer 70 coated on the second cover plate 80 does not exceed the edge of the second cover plate 80, when the second adhesive layer 70 is coated on the second cover plate 80, a distance between the edge of the second adhesive layer 70 and the edge of the second cover plate 80 may be configured to be relatively large. Correspondingly, when the second cover plate 80 coated with the second adhesive layer 70 is bonded to the side of the first cover plate 20 away from the display panel 10, an edge of an orthographic projection of the second adhesive layer 70 between the first cover plate 20 and the second cover plate 80 on the first plane may be located inside the edge of the orthographic projection of the first cover plate 20 on the first plane, that is, the orthographic projection of the second adhesive layer 70 between the first cover plate 20 and the second cover plate 80 on the first plane may be located within the orthographic projection of the first cover plate 20 on the first plane, and there may be a certain distance from the edge of the orthographic projection of the second adhesive layer 70 between the first cover plate 20 and the second cover plate 80 on the first plane to the edge of the orthographic projection of the first cover plate 20 on the first plane. The second adhesive layer 70 between the first cover plate 20 and the second cover plate 80 may retract with respect to the edge of the first cover plate 20.

Figure 8:
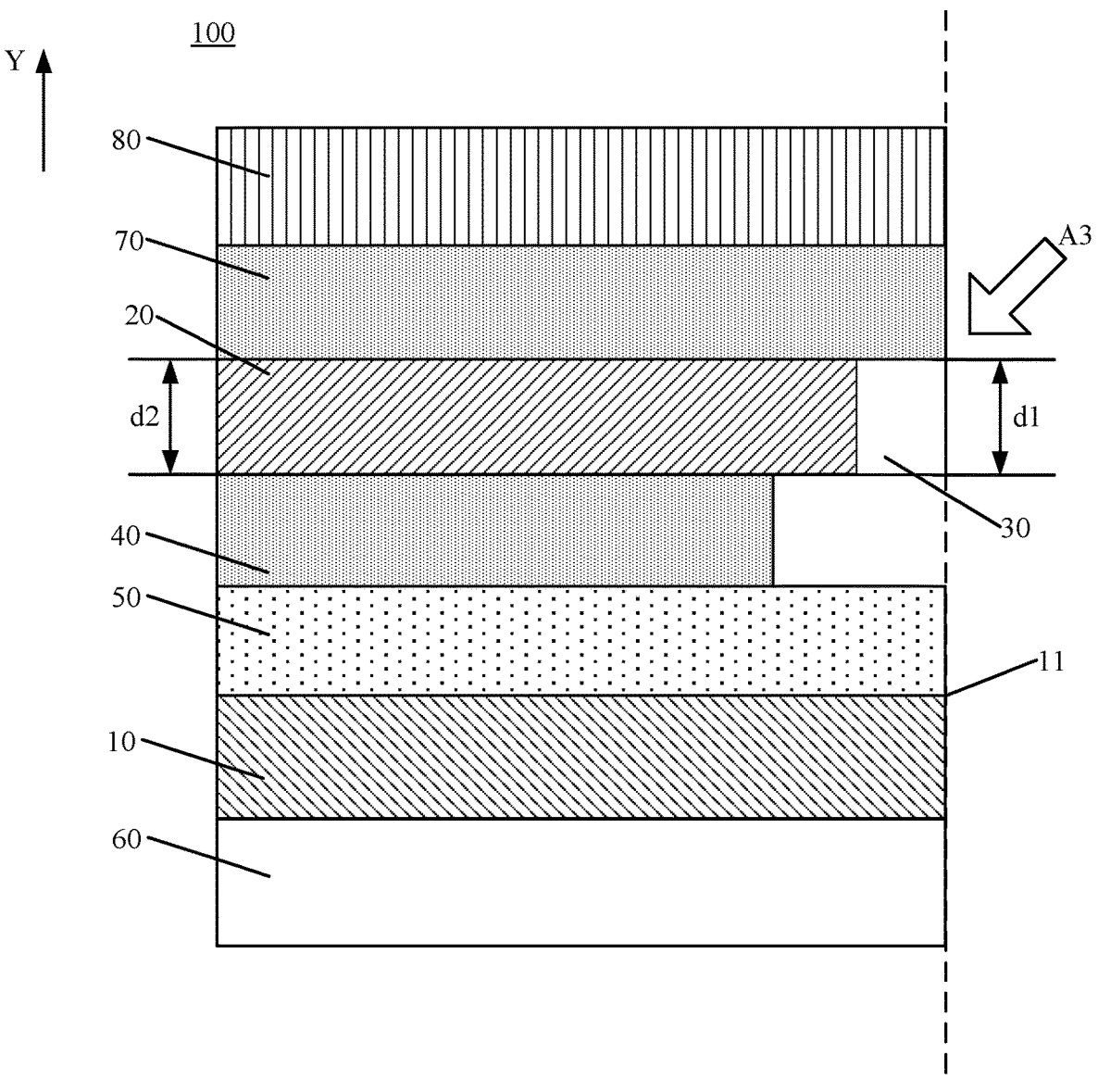
FIG. 8 illustrates another local structure of an exemplary display module consistent with various embodiments of the present disclosure.

To increase the firmness of the bonding of the protection layer 30 and the side edges of the first cover plate 20, in another embodiment shown in FIG. 8, the display module 100 may further include a second adhesive layer 70 on the side of the first cover plate 20 away from the display panel 10. The edge of the orthographic projection of the second adhesive layer 70 on the first plane may be located outside the edge of the orthographic projection of the first cover plate 20 on the first plane, and the orthographic projection of the second adhesive layer 70 on the first plane may at least partially overlap the orthographic projection of the protection layer 30 on the first direction.

In the present embodiment, the edge of the orthographic projection of the second adhesive layer 70 on the first plane may be located outside the edge of the orthographic projection of the first cover plate 20 on the first plane, that is, the orthographic projection of the first cover plate 20 on the first plane may be located within the orthographic projection of the second adhesive layer 70 on the first plane. There may be a certain distance between the edge of the orthographic projection of the first cover plate 20 on the first plane and the edge of the orthographic projection of the second adhesive layer 70 on the first plane, that is, the second adhesive layer 70 may expand outward relative to the edge of the first cover plate 20.

Further, in this embodiment, the orthographic projection of the second adhesive layer 70 on the first plane and the orthographic projection of the protection layer 30 on the first plane may at least partially overlap. Since the protection layer 30 may be at least bonded with the side edges of the first cover plate 20, the second adhesive layer 70 may spread out relative to the edge of the first cover plate 20 to at least partially contact the protection layer 30, enhancing the fixation of the protection layer. At this time, not only the protection layer 30 may be able to act as a buffer when the side edges of the first cover plate 20 are directly impacted, but also the portion of the second adhesive layer 70 expanding outwards with respect to the edge of the first cover plate 20 may act as a buffer when the first cover plate 20 is subjected to an impact pointing obliquely from the side of the first cover plate 20 facing the display panel 10 to the side edges of the first cover plate 20 as shown by arrow A3 in FIG. 8, to further enhance the protection effect on the side edges of the first cover plate 20.

The embodiment shown in FIG. 8 where the thickness d1 of the protection layer 30 is equal to the thickness d2 of the first cover plate 20 in the direction Y perpendicular to the first plane is used as an example only to illustrate the present disclosure, and does not limit the scope of the present disclosure. The same may be applied to the case where the thickness d1 of the protection layer 30 is larger than the thickness d2 of the first cover plate 20 in the direction Y perpendicular to the first plane.

The embodiment shown in FIG. 8 where the orthographic projection of the protection layer 30 on the first plane completely overlaps the orthographic projection of the second adhesive layer 70 on the first plane is used as an example only to illustrate the present disclosure, and does not limit the scope of the present disclosure. In some other embodiment, the orthographic projection of the protection layer 30 on the first plane may partially overlap the orthographic projection of the second adhesive layer 70 on the first plane.

Figure 9:
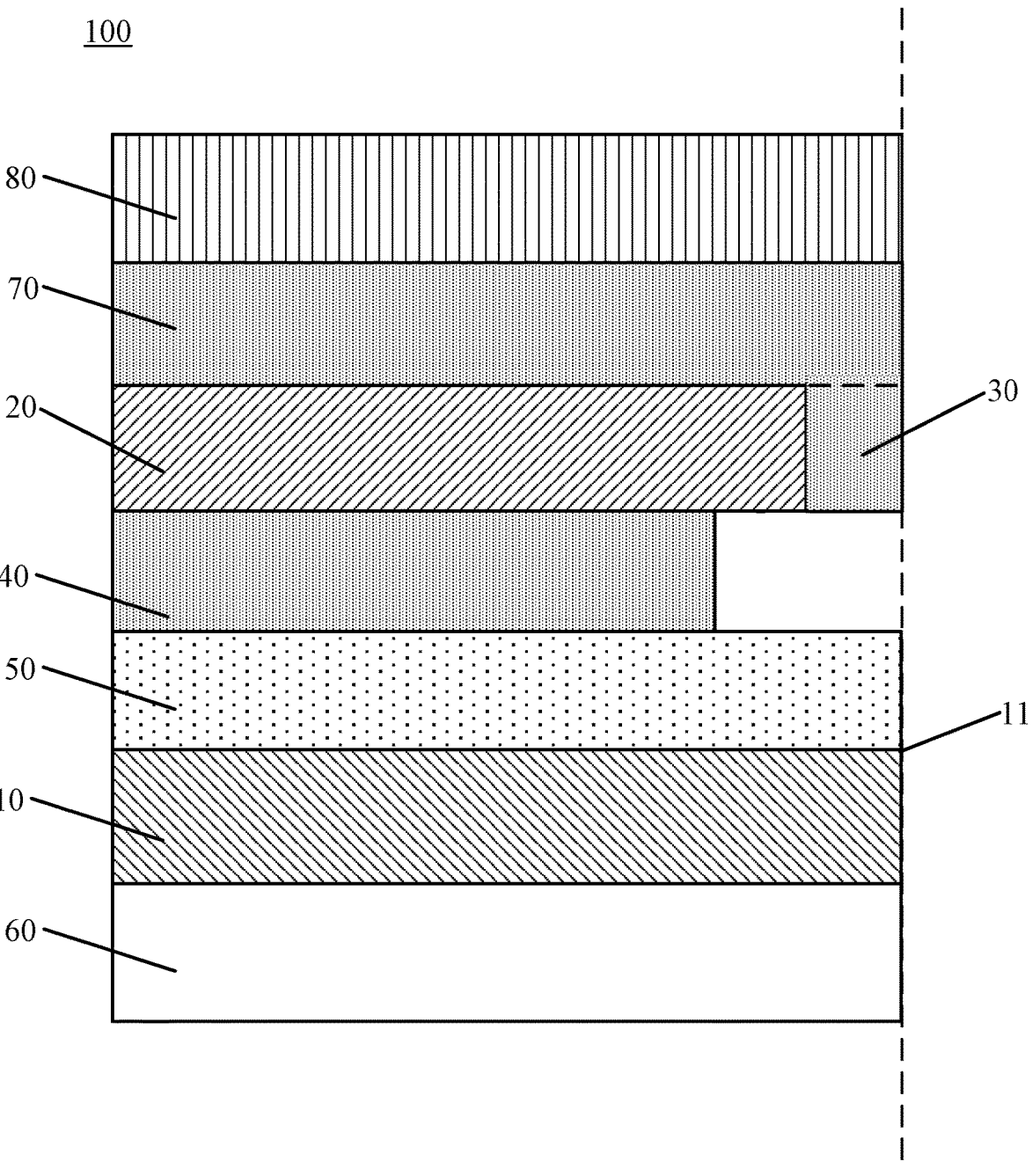
FIG. 9 illustrates another local structure of an exemplary display module consistent with various embodiments of the present disclosure.

In one embodiment shown in FIG. 9, the protection layer 30 and the second adhesive layer 70 may be integrally formed, that is, the protection layer 30 may be formed by the second adhesive layer 70 extending to the side edges of the first cover plate 20. Specifically, a second cover plate 80 coated with the second adhesive layer 70 may be provided, and the second cover plate 80 may be bonded with the side of the first cover plate 20 away from the display panel 10 by using the second adhesive layer 70, such that the edge of the orthographic projection of the second adhesive layer 70 on the first plane is located outside the edge of the orthographic projection of the first cover plate 20 on the first plane. Then, a roller may roll back and forth on the side of the first cover plate 20 away from the display panel 10, such that the second adhesive layer 70 extends to the side edges of the first cover plate 20 to form the protection layer 30 attached to the side edges of the first cover plate 20.

In the actual process, after the second cover plate 80 is attached to the side of the first cover plate 20 facing away from the display panel 10, the edge of the display module 100 may be cut to partially cut off a redundant portion of the second cover plate 80. Therefore, in this embodiment, when coating the second adhesive layer 70 on the second cover plate 80, the edge of the second adhesive layer 70 may be not disposed far from the edge of the second cover plate 80, but the edge of the second glue layer 70 may be configured to be closer to the edge of the second cover plate 80 or even the edge of the second glue layer 70 and the edge of the second cover plate 80 may coincide. Then, the second cover plate 80 with the second adhesive layer may be bonded with the side of the first cover plate 20 away from the display panel 10 by using the second adhesive layer 70. The roller may roll back and forth on the side of the first cover plate 20 away from the display panel 10, such that the second adhesive layer 70 extends to the side edges of the first cover plate 20 to form the protection layer 30 attached to the side edges of the first cover plate 20. Subsequently, the abundant portions of the second adhesive layer 70 and the second cover plate 80 may be cut off at the same time.

Figure 10:
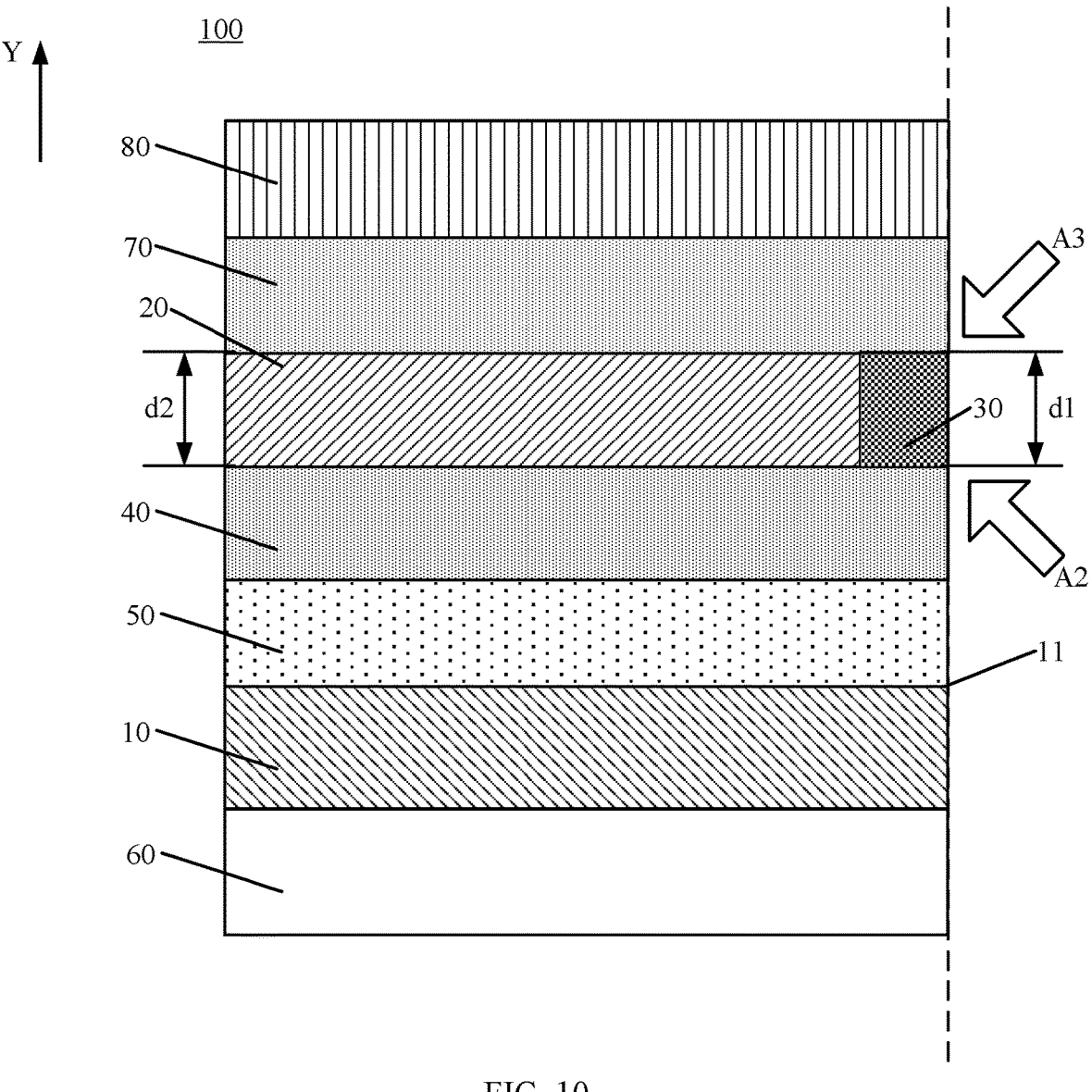
FIG. 10 illustrates another local structure of an exemplary display module consistent with various embodiments of the present disclosure.

In another embodiment shown in FIG. 10, the display module 100 may further include a first adhesive layer 40 between the display panel 10 and the first cover plate 20. The edge of the orthographic projection of the first adhesive layer 40 on the first plane may be located outside the edge of the orthographic projection of the first cover plate 20 on the first plane, and the orthographic projection of the first adhesive layer 40 on the first plane and the orthographic projection of the protection layer 30 on the first plane may at least partially overlap.

The display module 100 may further include a second adhesive layer 70 on the side of the first cover plate 20 away from the display panel 10. The edge of the orthographic projection of the second adhesive layer 70 on the first plane may be located outside the edge of the orthographic projection of the first cover plate 20 on the first plane, and the orthographic projection of the second adhesive layer 70 on the first plane may at least partially overlap the orthographic projection of the protection layer 30 in the first direction.

In this embodiment, the edge of the orthographic projection of the first adhesive layer 40 on the first plane may be located outside the edge of the orthographic projection of the first cover plate 20 on the first plane, that is, the orthographic projection of the first cover plate 20 on the first plane may be located within the orthographic projection of the first adhesive layer 40 on the first plane. There may be a certain distance between the edge of the orthographic projection of the first cover plate 20 on the first plane and the edge of the orthographic projection of the first adhesive layer 40 on the first plane, that is, the first adhesive layer 40 may expand outward relative to the edge of the first cover plate 20.

At the same time, in this embodiment, the edge of the orthographic projection of the second adhesive layer 70 on the first plane may be located outside the edge of the orthographic projection of the first cover plate 20 on the first plane, that is, the edge of the first cover plate 20 on the first plane may be located within the orthographic projection of the second adhesive layer 70 on the first plane. There may be a certain distance between the edge of the orthographic projection of the first cover plate 20 on the first plane and the edge of the orthographic projection of the second adhesive layer 70 on the first plane, that is, the second adhesive layer 70 may expand outward relative to the edge of the first cover plate 20.

Moreover, in this embodiment, the orthographic projection of the first adhesive layer 40 on the first plane may at least partially overlap the orthographic projection of the protection layer 30 on the first plane, and the orthographic projection of the second adhesive layer 70 on the first plane may also at least partially overlap the orthographic projection of the protection layer 30 on the first plane. Since the protection layer 30 may be at least attached to the side edges of the first cover plate 20, the first adhesive layer 40 and the second adhesive layer 70 may both expand outwards with respect to the side edges of the first cover plate 20 to at least partly contact the protection layer 30, to further enhance the fixation of the protection layer 30. At this time, not only the protection layer 30 may be able to act as a buffer when the side edges of the first cover plate 20 are directly impacted, but also the portion of the first adhesive layer 40 expanding outwards with respect to the edge of the first cover plate 20 may act as a buffer when the first cover plate 20 is subjected to an impact pointing obliquely from the side of the first cover plate 20 facing the display panel 10 to the side edges of the first cover plate 20 as shown by arrow A2 in FIG. 10, to further enhance the protection effect on the side edges of the first cover plate 20. Also, the portion of the second adhesive layer 70 expanding outwards with respect to the edge of the first cover plate 20 may act as a buffer when the first cover plate 20 is subjected to an impact pointing obliquely from the side of the first cover plate 20 facing the display panel 10 to the side edges of the first cover plate 20, to further enhance the protection effect on the side edges of the first cover plate 20.

The embodiment shown in FIG. 10 where the thickness d1 of the protection layer 30 is equal to the thickness d2 of the first cover plate 20 in the direction Y perpendicular to the first plane is used as an example only to illustrate the present disclosure, and does not limit the scope of the present disclosure. The same may be applied to the case where the thickness d1 of the protection layer 30 is larger than the thickness d2 of the first cover plate 20 in the direction Y perpendicular to the first plane.

The embodiment shown in FIG. 10 where the orthographic projection of the protection layer 30 on the first plane completely overlaps the orthographic projection of the second adhesive layer 70 on the first plane is used as an example only to illustrate the present disclosure, and does not limit the scope of the present disclosure. In some other embodiment, the orthographic projection of the protection layer 30 on the first plane may partially overlap the orthographic projection of the second adhesive layer 70 on the first plane.

Figure 11:
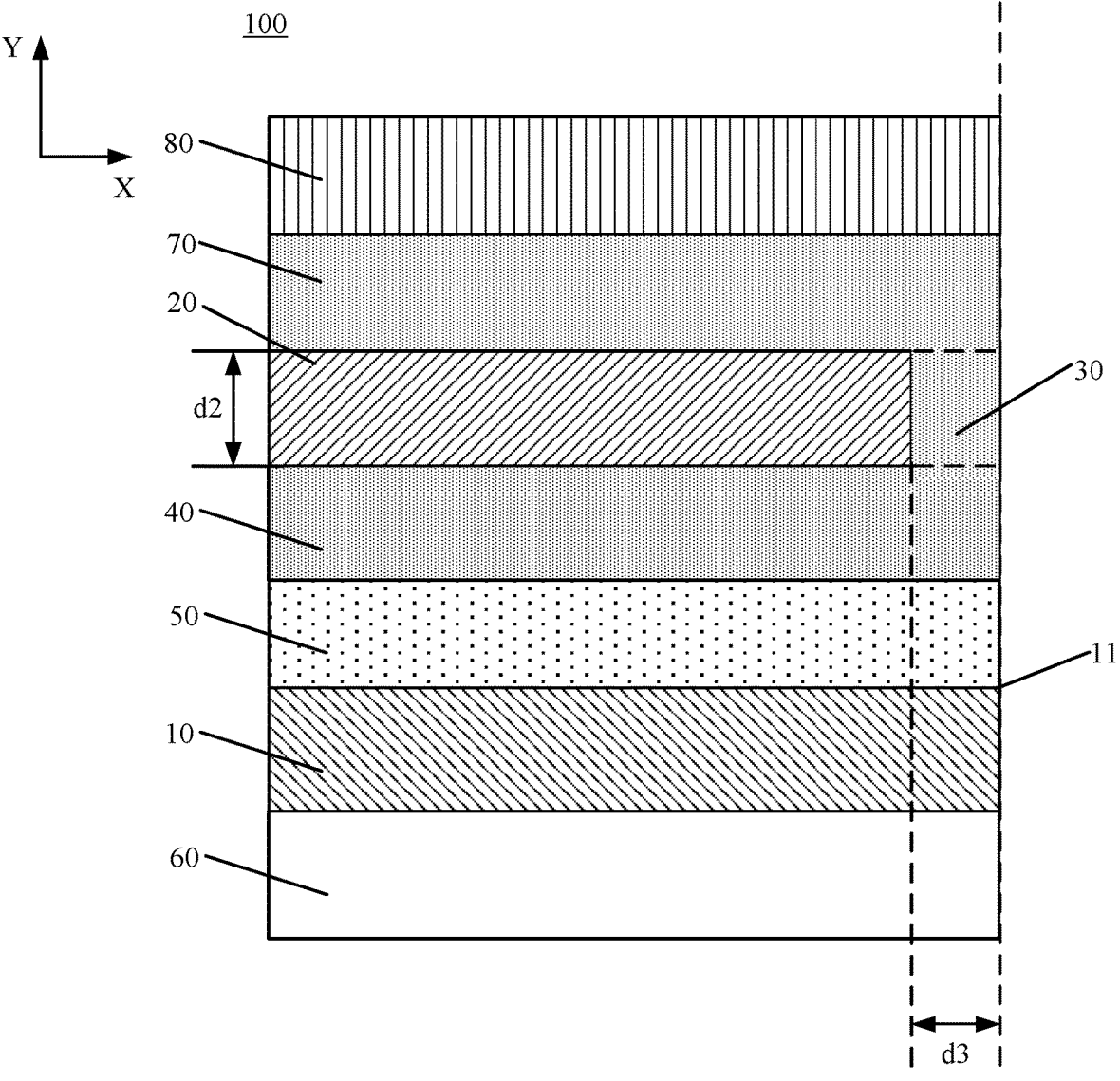
FIG. 11 illustrates another local structure of an exemplary display module consistent with various embodiments of the present disclosure.

In one embodiment shown in FIG. 11, the protection layer 30, the first adhesive layer 40, and the second adhesive layer 70 may be integrally formed, that is, the protection layer 30 may be formed by the first adhesive layer 40 and the second adhesive layer 70 extending to the side edges of the first cover plate 20 at the same time.

Specifically, the display panel 10 may further include a surface to be bonded 11, and the first adhesive layer 40 may be coated on a side of the surface to be bonded 11 of the display panel 10 first, and the first cover plate 20 may be bonded to the side of the display panel 10 with the surface to be bonded 11 by using the first adhesive layer 40. The edge of the orthographic projection of the first adhesive layer 40 on the first plane may be located outside the edge of the orthographic projection of the first cover plate 20 on the first plane. Subsequently, a second cover plate 80 coated with the second adhesive layer 70 may be provided, and the second cover plate 80 may be bonded with the side of the first cover plate 20 away from the display panel 10 by using the second adhesive layer 70, such that the edge of the orthographic projection of the second adhesive layer 70 on the first plane is located outside the edge of the orthographic projection of the first cover plate 20 on the first plane. Then, a roller may roll back and forth on the side of the first cover plate 20 away from the display panel 10, such that the second adhesive layer 70 extends to the side edges of the first cover plate 20 to form the protection layer 30 attached to the side edges of the first cover plate 20.

The first adhesive layer 40 and the second adhesive layer 70 may expand outwards relative to the edge of the first cover plate 20 at the same time, the subsequent process of rolling back and forth on the side of the second cover plate 80 away from the first cover plate 20 may be performed. The portion of the first adhesive layer 40 that expands relative to the edge of the first cover plate 20 and the portion of the second adhesive layer 70 that expands relative to the edge of the first cover plate 20 may be bonded together to form the protection layer 30, such that the edge portion of the first cover plate 20 is protected by wrapping to protect the edge portion of the first cover plate and increase the cushioning effect.

As shown in FIG. 11, when the first adhesive layer 40 and the second adhesive layer 70 may expand outwards relative to the edge of the first cover plate 20 at the same time, a width d3 of the protection layer 30 along the first direction X formed on the side edges of the first cover plate 20 may be small if the distance at which the first adhesive layer 40 and the second adhesive layer 70 expand outwards relative to the edge of the first cover plate 20 is small. Correspondingly, the buffer function of the protection layer 30 under the external impact may be not good. The first direction X may be parallel to the first plane and perpendicular to the side edges of the first cover plate 20. The width of the protection layer 30 along the first direction X may be also related to the thickness d2 of the first cover plate 20 along the direction Y perpendicular to the first plane.

In one embodiment of the present disclosure, when the thickness d2 of the first cover plate 20 in the direction Y perpendicular to the first plane is less than 50 μm, a distance between the edge of the orthographic projection of the first adhesive layer 40 on the first plane and the edge of the orthographic projection of the first cover plate 20 on the first plane may be larger than or equal to 0.25 mm, and a distance between the edge of the orthographic projection of the second adhesive layer 70 on the first plane and the edge of the orthographic projection of the first cover plate 20 on the first plane may be larger than or equal to 0.25 mm. That is, the first adhesive layer 40 and the second adhesive layer 70 may expand outwards at a distance larger than or equal to 0.25 mm relative to the edge of the first cover plate 20 at the same time.

When the thickness d2 of the first cover plate 20 in the direction Y perpendicular to the first plane is larger than or equal to 50 μm, the distance between the edge of the orthographic projection of the first adhesive layer 40 on the first plane and the edge of the orthographic projection of the first cover plate 20 on the first plane may be larger than or equal to 0.35 mm, and the distance between the edge of the orthographic projection of the second adhesive layer 70 on the first plane and the edge of the orthographic projection of the first cover plate 20 on the first plane may be larger than or equal to 0.35 mm. That is, the first adhesive layer 40 and the second adhesive layer 70 may expand outwards at a distance larger than or equal to 0.35 mm relative to the edge of the first cover plate 20 at the same time.

In the present embodiment, when the thickness d2 of the first cover plate 20 in the direction Y perpendicular to the first plane is less than 50 μm, the first adhesive layer 40 and the second adhesive layer 70 may expand outwards at a distance larger than or equal to 0.25 mm relative to the edge of the first cover plate 20 at the same time. Therefore, the width of the protection layer 30 in the first direction X may be large enough to play a good cushioning effect when subjected to external impact. when the thickness d2 of the first cover plate 20 in the direction Y perpendicular to the first plane is larger than or equal to 50 μm, the first adhesive layer 40 and the second adhesive layer 70 may expand outwards at a distance larger than or equal to 0.35 mm relative to the edge of the first cover plate 20 at the same time. Therefore, the width of the protection layer 30 in the first direction X may be large enough to play a good cushioning effect when subjected to external impact.

When the thickness d2 of the first cover plate 20 in the direction Y perpendicular to the first plane is larger, the distance at which the first adhesive layer 40 and the second adhesive layer 70 may expand outwards relative to the edge of the first cover plate 20 at the same time may need to be larger, such that the width of the protection layer 30 in the first direction X may be large enough to play a good cushioning effect when subjected to external impact.

The present disclosure has no specific limit on the distance at which the first adhesive layer 40 and the second adhesive layer 70 may expand outwards relative to the edge of the first cover plate 20 at the same time, as long as the width of the protection layer 30 in the first direction X is large enough to play a good cushioning effect when subjected to external impact.

The embodiment in FIG. 10 where the distance at which the first adhesive layer 40 and the second adhesive layer 70 may expand outwards relative to the edge of the first cover plate 20 at the same time are same d3 is used as an example to illustrate the present disclosure, and does not limit the scope of the present disclosure. In some other embodiments, the distance at which the first adhesive layer 40 and the second adhesive layer 70 may expand outwards relative to the edge of the first cover plate 20 at the same time may also be different.

After the first adhesive layer 40 is coated on the surface to be bonded 11 of the display panel 10, the first cover plate 20 may be bonded to the side of the surface to be bonded 11 of the display panel 10. At this time, the distance by which the first adhesive layer 40 expands outwards relative to the side edges of the first cover plate 20 may not be well determined. At the same time, the second adhesive layer 70 may be first coated on the second cover plate 80 and then the second cover plate 80 coated with the second adhesive layer 70 may be bonded the side of the first cover plate 20 away from the display panel 10. At this time, the distance by which the second adhesive layer 70 expands outwards relative to the side edges of the first cover plate 20 may not be well determined.

Based on this, optionally, in one embodiment of the present disclosure, as shown in FIG. 11, the orthographic projection of the first adhesive layer 40 on the first plane, and the orthographic projection of the second adhesive layer 70 on the first plane, may both coincide the orthographic projection of the display panel 10 on the first plane.

In this embodiment, since the retraction distance of the first cover plate 20 relative to the edge of the display panel 10 is relatively easy to control, that is, considering the edge of the orthographic projection of the first cover plate 20 on the first plane and the edge of the orthographic projection of the display panel 10 on the first plane are relatively easy to control, the edge of the first cover plate 20 may not directly be used as a reference, but the edge of the display panel 10 may be as a reference instead.

When coating the first adhesive layer 40 on the surface to be bonded 11 of the display panel 10, the edge of the first adhesive layer 40 may be controlled based on the edge of the display panel 10, such that the edge of the orthographic projection of the first adhesive layer 40 on the first plane coincides with the edge of the orthographic projection of the display panel 10 on the first plane.

At the same time, the edge of the display panel 10 may be flush with the edge of the second cover plate 80 when it is cut, such that the edge of the second adhesive layer 70 may also be controlled based on the edge of the display panel 10 (or the edge of the second cover plate 80). Specifically, the orthographic projection of the second adhesive layer 70 on the first plane may be controlled to be larger than or equal to the orthographic projection of the display panel 10 on the first plane, such that the edge of the orthographic projection of the second adhesive layer 70 on the first plane coincides with the edge of the orthographic projection of the display panel 10 on the first plane after the second cover plate 80 is cut.

Based on that the edge of the orthographic projection of the first adhesive layer 40 on the first plane coincides with the edge of the orthographic projection of the display panel 10 on the first plane and the edge of the orthographic projection of the second adhesive layer 70 on the first plane coincides with the edge of the orthographic projection of the display panel 10 on the first plane, as long as the distance between the edge of the orthographic projection of the display panel 10 on the first plane and the edge of the orthographic projection of the first cover plate 20 on the first plane (d3 in FIG. 11) meets the requirements, the distance between the edges of the orthographic projection of the first adhesive layer 40 and the second adhesive layer 70 on the first plane and the edge of the orthographic projection of the first cover plate 20 on the first plane may meet the requirements, such that the width of the protection layer 30 in the first direction X may be large enough to play a good cushioning effect when subjected to external impact.

For example, when the thickness of the first cover plate 20 in the direction Y perpendicular to the first plane is less than 50 μm, the distance between the edge of the orthographic projection of the display panel 10 on the first plane and the edge of the orthographic projection of the first cover plate 20 on the first plane (d3 in FIG. 11) may be controlled to be larger than or equal to 0.25 mm, and then the distance between the edges of the first adhesive layer 40 and the second adhesive layer 70 on the first plane and the edge of the orthographic projection of the first cover plate 20 on the first plane (d3 in FIG. 11) may be also greater than or equal to 0.25 mm. When the thickness of the first cover plate 20 in the direction Y perpendicular to the first plane is larger than or equal to 50 μm, the distance between the edge of the orthographic projection of the display panel 10 on the first plane and the edge of the orthographic projection of the first cover plate 20 on the first plane (d3 in FIG. 11) may be controlled to be larger than or equal to 0.35 mm, and then the distance between the edges of the first adhesive layer 40 and the second adhesive layer 70 on the first plane and the edge of the orthographic projection of the first cover plate 20 on the first plane (d3 in FIG. 11) may be also greater than or equal to 0.35 mm.

In another embodiment shown in FIG. 1 to FIG. 6, FIG. 8, and FIG. 10, the protection layer 30 may be a third adhesive layer 30 that is attached to at least part of the side edges of the first cover plate 20 alone. That is, in this embodiment, the protection layer 30 may be the third adhesive layer 30 different from the first adhesive layer 40 and the second adhesive layer 70. Correspondingly, the edge of the orthographic projection of the first adhesive layer 40 on the first plane may be located inside the edge of the orthographic projection of the first cover plate 20 on the first plane, and the edge of the orthographic projection of the second adhesive layer 70 on the first plane may also be located inside the edge of the orthographic projection of the first cover plate 20 on the first plane. That is, the first adhesive layer 40 and the second adhesive layer 70 may retract inwards relative to the edge of the first cover plate 20 at the same time, and the third adhesive layer 30 may be formed and bonded on the side edges of the first cover plate 20 alone.

Since the first adhesive layer 40 and the second adhesive layer 70 retract inwards relative to the edge of the first cover plate 20 at the same time, as shown in FIG. 3 to FIG. 5, the third adhesive layer 30 formed alone may also extend into the surfaces of the first cover plate 20 facing and/or away from the display panel 10, such that the thickness of the third adhesive layer 30 is larger than the thickness of the first cover plate 20. The orthographic projection of the third adhesive layer 30 on the first plane may partially overlap the orthographic projection of the first cover plate 20 on the first plane. In another embodiment, as shown in FIG. 1, FIG. 2, FIG. 6, FIG. 8 and FIG. 10, the thickness of the third adhesive layer 30 may be equal to the thickness of the first cover plate 20, and the orthographic projection of the third adhesive layer 30 on the first plane and the orthographic projections of the first cover plate 20 on the first plane may not overlap. That is, the third adhesive layer 30 may be only attached to the side edges of the first cover plate 20.

In one embodiment shown in FIG. 1 to FIG. 11, the first cover plate 20 may be an ultra-thin glass (UTG) cover plate.

Figure 12:
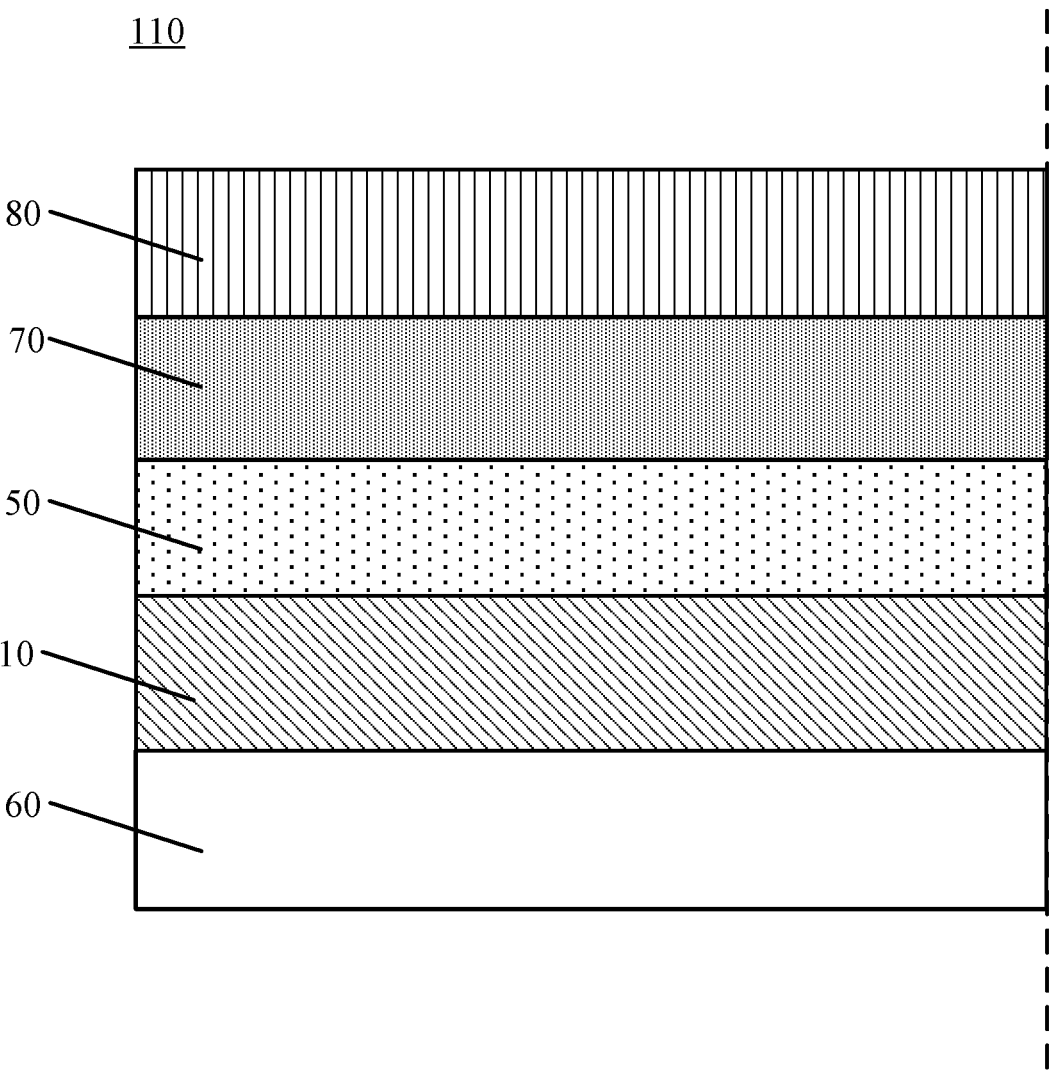
FIG. 12 illustrates a local structure of an existing display module without ultra-thin glass (UTG) cover plate.

FIG. 12 shows a local structure of a display module 110 without the ultra-thin glass cover plate in the existing technologies. As shown in FIG. 12, the display module 110 without the ultra-thin glass cover plate includes a backplane 60, a display panel 10, a polarizer 50, a second adhesive layer 70 and a second cover plate 80 stacked in sequence. The second cover plate 80 can be a PET cover plate (polyester plate) or a CPI cover plate (clear polyimide cover plate). Although the PET cover plate and the CPI cover plate have the advantages of transparency, softness, and foldability, they have disadvantages such as easy aging, poor sealing, low hardness, and easy scratches, which make the display module 110 without the ultra-thin glass cover plate have poor bearing strength.

In the present disclosure, the display module 100 may include the first cover plate 20 made of ultra-thin glass. Ultra-thin glass has excellent characteristics due to its high visible light transmittance, high hardness, scratch resistance, low crease resistance, high temperature resistance, and good bendability, especially the greatly improved bearing strength. However, the disadvantage of the ultra-thin glass is that the impact resistance is weak, and the edge of the ultra-thin glass cover plate is prone to cracks when it is subject to external impact. Therefore, in the display module 100 provided in the embodiment of the present disclosure, at least part of the side edges of the first cover plate 20 may be provided with the protection layer 30, and the protection layer 30 may have elasticity, such that the edge portion of the first cover plate 20 is protected by the protection layer 30 and is not prone to cracks under the impact because of the buffering effect of the protection layer 30. Therefore, the advantages of the ultra-thin glass are able to be fully utilized, and the display module using the ultra-thin glass cover plate may have excellent characteristics. Moreover, in the display module 100 provided in the embodiment of the present disclosure, the second cover plate 80 may be a PET cover plate or a CPI cover plate, which increases the surface hardness of the overall cover plate and reduces the fragility of the first cover plate 20 as an ultra-thin glass cover plate. The reliability of the display module 100 may be improved.

Figure 13:
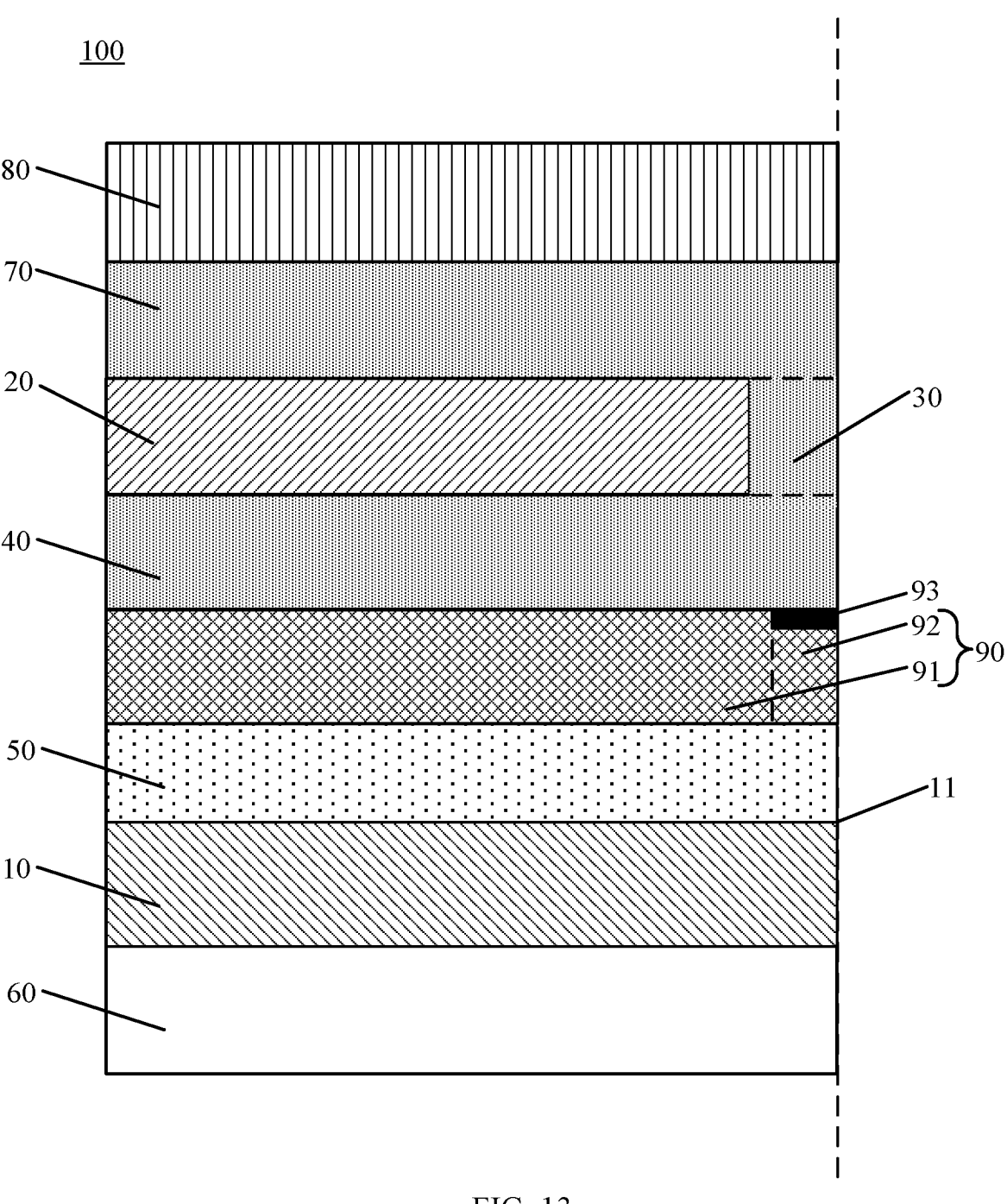
FIG. 13 illustrates another local structure of an exemplary display module consistent with various embodiments of the present disclosure.

In one embodiment of the present disclosure, as shown in FIG. 13, the display module 100 may further include an ink carrying layer 90 located between the display panel 10 and the first adhesive layer 40. The ink carrying layer 90 may include a first portion 91 and a second portion 92 surrounding the first portion 91. The second portion 92 may carry an ink layer 93. An orthographic projection of the ink layer 93 on the first plane may be located outside the edge of the orthographic projection of the first cover plate 20 on the first plane.

In this embodiment, the protection layer 30 may be transparent and may not affect the frame design of the display module 100. Therefore, the ink carrying layer 90 may be separately provided between the display panel 10 and the first adhesive layer 40. That is, the ink carrying layer 90 may be separate from the protection layer 30. The ink carrying layer 90 may include the first portion 91 and the second portion 92 surrounding the first portion 91. The second portion 92 may carry the ink layer 93. The ink layer 93 may be made of an opaque ink material.

In this embodiment, the orthographic projection of the ink layer 93 on the first plane may be located outside the edge of the orthographic projection of the first cover plate 20 on the first plane. That is, the orthographic projection of the ink layer 93 on the first plane may be located outside the orthographic projection of the first cover plate 20 on the first plane, such that the ink layer 93 may be very narrow, facilitating the realization of the narrow-frame and large-screen design of the display module 100.

Figure 14:
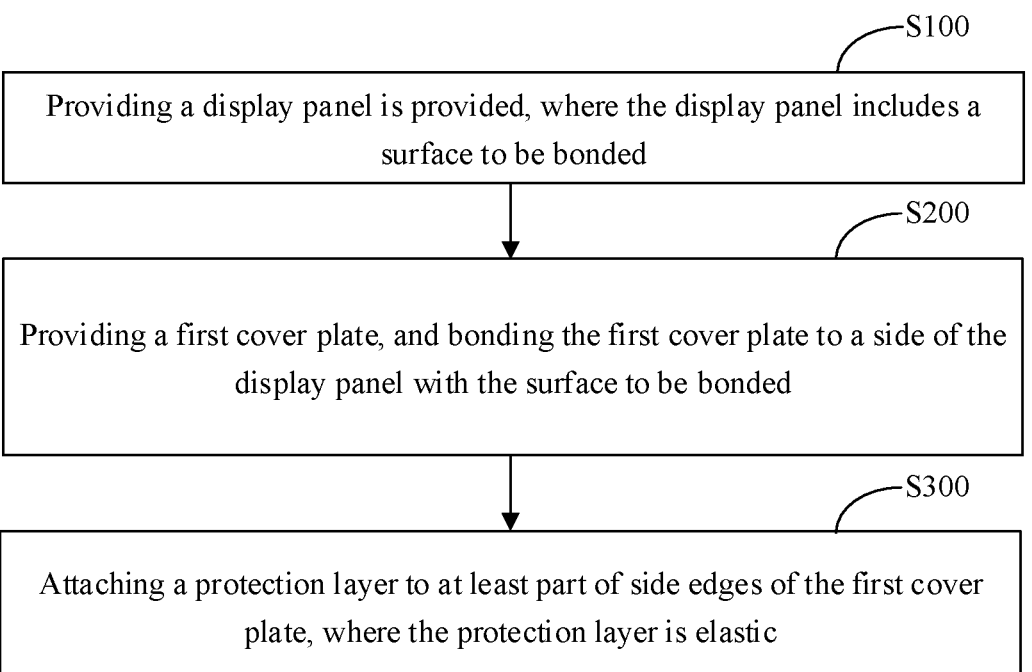
FIG. 14 illustrates an exemplary fabrication method of a display module consistent with various disclosed embodiments of the present disclosure.

The present disclosure also provides a fabrication method of a display module. In one embodiment, as shown in FIG. 14 with reference to FIG. 1 to FIG. 6, FIG. 8 and FIG. 10, the method may include:

S100: providing a display panel 10 where the display panel 10 may include a surface to be bonded 11;

S200: providing a first cover plate 20 and bonding the first cover plate 20 to the side of the surface to be bonded 11 of the display panel 10, where the edge of the orthographic projection of the first cover plate 20 on the first plane may be located inside the edge of the orthographic projection of the display panel 10 on the first plane and the first plane is the plane where the display module is located; and S300: attaching a protection layer 30 on at least part of the side edges of the first cover plate 20, where the protection layer 30 is elastic.

In the fabrication method of the display module provided by the embodiments of the present disclosure, the edge of the orthographic projection of the first cover plate 20 on the first plane may be configured to be located inside the edge of the orthographic projection of the display panel 10 on the first plane, such that the edge of the first cover plate 20 may be prevented from being cut to cause cracks in the fabrication process of the display module. Further, the protection layer 30 may be attached to at least part of the side edges of the first cover plate 20, and the protection layer 30 may be elastic. During the use of the display module, the edge of the first cover plate 20 may be not easily cracked due to external impact, thereby reducing the fragility of the first cover plate 20 and improving the reliability of the display module.

In another embodiment shown in FIG. 7, bonding the first cover plate 20 to the side of the surface to be bonded 11 of the display panel 10 may include: coating a first adhesive layer 40 on the side of the surface to be bonded 11 of the display panel 10, and bonding the first cover plate 20 to the side of the surface to be bonded 11 of the display panel 10 by using the first adhesive layer 40, such that the edge of the orthographic projection of the layer 40 on the first plane is located outside the edge of the orthographic projection of the first cover plate 20 on the first plane.

Attaching the protection layer 30 on at least part of the side edges of the first cover plate 20 may include: rolling a roller back and forth on a side of the first cover plate 20 away from the display panel 10, such that the first adhesive layer 40 extends into the side edges of the first cover plate 20 to form the protection layer.

In another embodiment, as shown in FIG. 9, before attaching the protection layer 30 on at least part of the side edges of the first cover plate 20, the method may further include: providing a second cover plate 80 coated with a second adhesive layer 70, and bonding the second cover plate 80 to the side of the first cover plate 20 away from the display panel 10 by using the second adhesive layer 70, where the edge of the orthographic projection of the second adhesive layer 70 on the first plane is located outside the edge of the orthographic projection of the first cover plate 20 on the first plane.

Attaching the protection layer 30 on at least part of the side edges of the first cover plate 20 may include: rolling a roller back and forth on a side of the second cover plate 80 away from the display panel 10, such that the second adhesive layer 70 extends into the side edges of the first cover plate 20 to form the protection layer.

In another embodiment, as shown in FIG. 11, bonding the first cover plate 20 to the side of the surface to be bonded 11 of the display panel 10 may include: coating a first adhesive layer 40 on the side of the surface to be bonded 11 of the display panel 10, and bonding the first cover plate 20 to the side of the surface to be bonded 11 of the display panel 10 by using the first adhesive layer 40, such that the edge of the orthographic projection of the layer 40 on the first plane is located outside the edge of the orthographic projection of the first cover plate 20 on the first plane.

Before attaching the protection layer 30 on at least part of the side edges of the first cover plate 20, the method may further include: providing a second cover plate 80 coated with a second adhesive layer 70, and bonding the second cover plate 80 to the side of the first cover plate 20 away from the display panel 10 by using the second adhesive layer 70, where the edge of the orthographic projection of the second adhesive layer 70 on the first plane is located outside the edge of the orthographic projection of the first cover plate 20 on the first plane.

Attaching the protection layer 30 on at least part of the side edges of the first cover plate 20 may include: rolling a roller back and forth on a side of the second cover plate 80 away from the display panel 10, such that the first adhesive layer 40 and the second adhesive layer 70 extend into the side edges of the first cover plate 20 to form the protection layer.

Since the first adhesive layer 40 and the second adhesive layer 70 both expand outwards relative to the edge of the first cover plate 20 at the same time, during the subsequent process of rolling the roller back and forth on the side of the second cover plate 80 away from the first cover plate 20, the portion of the first adhesive layer 40 that expands outwards relative to the edge of the first cover plate 20 and the portion of the second adhesive layer 70 that expands outwards relative to the edge of the first cover plate 20 may be bonded together to form the protection layer 30, such that the edge portion of the first cover plate 20 is protected by wrapping to increase the cushioning effect.

Optionally, in yet another embodiment of the present disclosure, as shown in FIG. 1 to FIG. 6, FIG. 8, and FIG. 10, attaching the protection layer 30 on at least part of the side edges of the first cover plate 20 may include: bonding a third adhesive layer 30 on at least part of the side edges of the first cover plate 20 separately as the protection layer 30.

In one embodiment of the present disclosure, as shown in FIG. 13, before coating the first adhesive layer 40 on the side of the surface to be bonded 11 of the display panel 10 and bonding the first cover plate 20 to the side of the surface to be bonded 11 of the display panel 10 by using the first adhesive layer 40, the method may further include: forming an ink carrying layer 90 on the side of the surface to be bonded 11 of the display panel 10, where the ink carrying layer 90 includes a first portion 91 and a second portion 92 surrounding the first portion 91; and forming an ink layer 93 on the second portion 92.

Coating the first adhesive layer 40 on the side of the surface to be bonded 11 of the display panel 10 and bonding the first cover plate 20 to the side of the surface to be bonded 11 of the display panel 10 by using the first adhesive layer 40 may include: coating the first adhesive layer 40 on the side of the ink carrying layer 90 away from the display panel 10, and using the first adhesive layer 40 to bond the first cover plate 20 on the side of the ink carrying layer 90 away from the display panel 10, where the orthographic projection of the ink layer 93 on the first plane is located outside the edge of the orthographic projection of the first cover plate 20 on the first plane.

Figure 15:
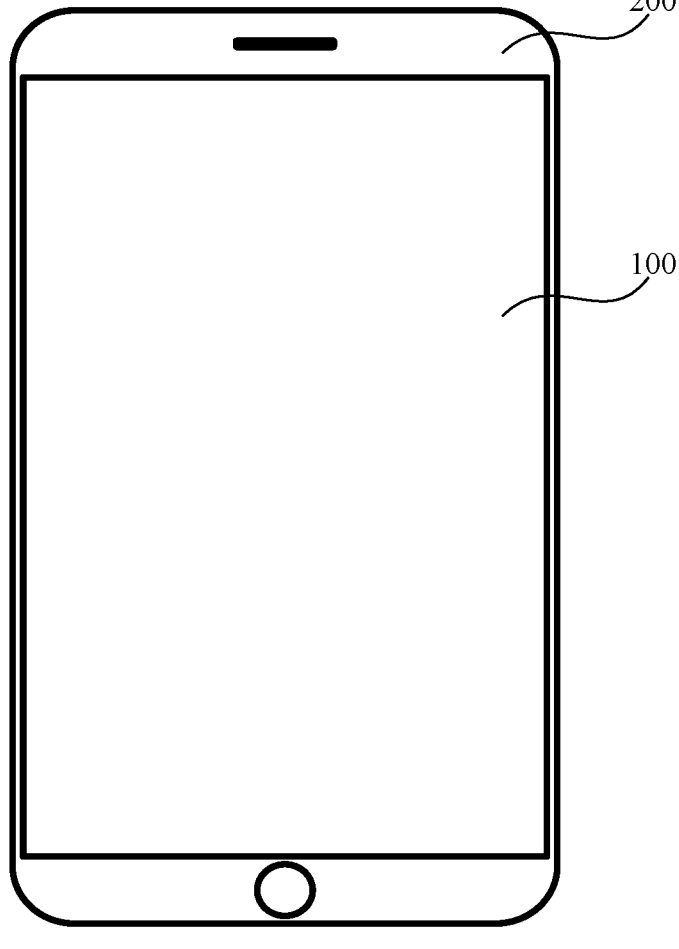
FIG. 15 illustrates an exemplary display device consistent with various disclosed embodiments of the present disclosure.

The present disclosure also provides a display device 200. As shown in FIG. 15, the display device 200 may include a display module 100 provided by various embodiments of the present disclosure. The display device 200 may be any electronic device with a display function, such as a touch screen, a mobile phone, a tablet computer, a notebook computer, an electronic paper book, or a television.

In the present disclosure, the edge of the orthographic projection of the first cover plate 20 on the first plane may be configured to be located inside the edge of the orthographic projection of the display panel 10 on the first plane, such that the edge of the first cover plate 20 may be prevented from being cut to cause cracks in the fabrication process of the display module. Further, the protection layer 30 may be attached to at least part of the side edges of the first cover plate 20, and the protection layer 30 may be elastic. During the use of the display module, the edge of the first cover plate 20 may be not easily cracked due to external impact, thereby reducing the fragility of the first cover plate 20 and improving the reliability of the display module.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display module, comprising a display panel, a first cover plate on a side of the display panel, a protection layer, a first adhesive layer between the display panel and the first cover plate, and a second adhesive layer on a side of the first cover plate away from the display panel, wherein:

an edge of an orthographic projection of the first cover plate on a first plane is located inside an edge of an orthographic projection of the display panel on the first plane, wherein the first plane is a plane where the display module is located;

the protection layer is attached to at least part of side edges of the first cover plate, and is elastic; and the protection layer and the first adhesive layer are integrally formed, or the protection layer and the second adhesive layer are integrally formed.

2. The display module according to claim 1, wherein:

the protection layer is disposed around a periphery of the first cover plate.

3. The display module according to claim 1, wherein:

in a direction perpendicular to the first plane, a thickness of the protection layer is equal to a thickness of the first cover plate, and an orthographic projection of the protection layer on the first plane and the orthographic projections of the first cover plate on the first plane do not overlap.

4. The display module according to claim 1, wherein:

in a direction perpendicular to the first plane, a thickness of the protection layer is larger than a thickness of the first cover plate, and an orthographic projection of the protection layer on the first plane and the orthographic projections of the first cover plate on the first plane partially overlap.

5. The display module according to claim 1, wherein:

an edge of an orthographic projection of the first adhesive layer on the first plane is located outside the edge of the orthographic projection of the first cover plate on the first plane, and the orthographic projection of the first adhesive layer on the first plane at least partially overlaps an orthographic projection of the protection layer on the first plane.

6. The display module according to claim 1, wherein:

an edge of an orthographic projection of the second adhesive layer on the first plane is located outside the edge of the orthographic projection of the first cover plate on the first plane, and the orthographic projection of the second adhesive layer on the first plane at least partially overlaps an orthographic projection of the protection layer on the first plane.

7. The display module according to claim 1, wherein:

an edge of an orthographic projection of the first adhesive layer on the first plane is located outside the edge of the orthographic projection of the first cover plate on the first plane, and the orthographic projection of the first adhesive layer on the first plane at least partially overlaps an orthographic projection of the protection layer on the first plane; and an edge of an orthographic projection of the second adhesive layer on the first plane is located outside the edge of the orthographic projection of the first cover plate on the first plane, and the orthographic projection of the second adhesive layer on the first plane at least partially overlaps the orthographic projection of the protection layer on the first plane.

8. The display module according to claim 7, wherein:

the protection layer, the first adhesive layer, and the second adhesive layer are integrally formed.

9. The display module according to claim 8, wherein:

when a thickness of the first cover plate in the direction perpendicular to the first plane is less than 50 µm, a distance between the edge of the orthographic projection of the first adhesive layer on the first plane and the edge of the orthographic projection of the first cover plate on the first plane is larger than or equal to 0.25 mm, and a distance between the edge of the orthographic projection of the second adhesive layer on the first plane and the edge of the orthographic projection of the first cover plate on the first plane is larger than or equal to 0.25 mm; and when the thickness of the first cover plate in the direction perpendicular to the first plane is larger than or equal to 50 µm, the distance between the edge of the orthographic projection of the first adhesive layer on the first plane and the edge of the orthographic projection of the first cover plate on the first plane is larger than or equal to 0.35 mm, and the distance between the edge of the orthographic projection of the second adhesive layer on the first plane and the edge of the orthographic projection of the first cover plate on the first plane is larger than or equal to 0.35 mm.

10. The display module according to claim 9, wherein:

both the orthographic projection of the first adhesive layer on the first plane and the orthographic projection of the second adhesive layer on the first plane coincide with the orthographic projection of the display panel on the first plane.

11. The display module according to claim 1, wherein:

the first cover plate is an ultra-thin glass cover plate.

12. A display module, comprising a display panel, a first cover plate on a side of the display panel, a protection layer, a first adhesive layer, and an ink carrying layer, wherein:

an edge of an orthographic projection of the first cover plate on a first plane is located inside an edge of an orthographic projection of the display panel on the first plane, wherein the first plane is a plane where the display module is located;

the protection layer is attached to at least part of side edges of the first cover plate, and is elastic;

the first adhesive layer is located between the display panel and the first cover plate; and the ink carrying layer is located between the display panel and the first adhesive layer, wherein:

the ink carrying layer includes a first portion and a second portion surrounding the first portion;

the second portion includes an ink layer; and an orthographic projection of the ink layer on the first plane is located outside the edge of the orthographic projection of the first cover plate on the first plane.

13. A display device, comprising a display module, wherein:

the display module includes a display panel, a first cover plate on a side of the display panel, a protection layer, a first adhesive layer between the display panel and the first cover plate, and a second adhesive layer on a side of the first cover plate away from the display panel;

an edge of an orthographic projection of the first cover plate on a first plane is located inside an edge of an orthographic projection of the display panel on the first plane, wherein the first plane is a plane where the display module is located;

the protection layer is attached to at least part of side edges of the first cover plate, and is elastic; and the protection layer and the first adhesive layer are integrally formed, or the protection layer and the second adhesive layer are integrally formed.

* * * * *